US007743248B2

(12) United States Patent
Bisbee et al.

(10) Patent No.: US 7,743,248 B2
(45) Date of Patent: Jun. 22, 2010

(54) SYSTEM AND METHOD FOR A REMOTE ACCESS SERVICE ENABLING TRUST AND INTEROPERABILITY WHEN RETRIEVING CERTIFICATE STATUS FROM MULTIPLE CERTIFICATION AUTHORITY REPORTING COMPONENTS

(75) Inventors: Stephen F. Bisbee, Baltimore, MD (US); Jack J. Moskowitz, Ellicott City, MD (US); Keith F. Becker, Baltimore, MD (US); Walter J. Hilton, Severna Park, MD (US); Joshua Szebenyi, Baltimore, MD (US)

(73) Assignee: eOriginal, Inc., Baltimore, MD (US)

( * ) Notice: Subject to any disclaimer, the term of this patent is extended or adjusted under 35 U.S.C. 154(b) by 720 days.

(21) Appl. No.: 10/620,817

(22) Filed: Jul. 16, 2003

(65) Prior Publication Data

US 2004/0093493 A1 May 13, 2004

Related U.S. Application Data

(63) Continuation-in-part of application No. 09/737,325, filed on Dec. 14, 2000, now Pat. No. 7,162,635, which is a continuation of application No. PCT/US00/32746, filed on Dec. 1, 2000, and a continuation-in-part of application No. 09/452,928, filed on Dec. 2, 1999, now Pat. No. 6,367,013, which is a continuation-in-part of application No. 09/072,079, filed on May 4, 1998, now Pat. No. 6,237,096, which is a continuation-in-part of application No. 08/528,841, filed on Sep. 15, 1995, now Pat. No. 5,748,738, which is a continuation-in-part of application No. 08/373,944, filed on Jan. 17, 1995, now Pat. No. 5,615,268, application No. 10/620,817.

(60) Provisional application No. 60/397,178, filed on Jul. 18, 2002.

(51) Int. Cl.
*H04L 9/32* (2006.01)

(52) U.S. Cl. .................... 713/158; 713/175; 713/156; 726/10

(58) Field of Classification Search ......... 713/155–158, 713/176, 178, 175; 726/5, 10
See application file for complete search history.

(56) References Cited

U.S. PATENT DOCUMENTS 4,200,770 A 4/1980 Hellman et al.
(Continued)

FOREIGN PATENT DOCUMENTS

DE 100 61 102 A1 6/2002
(Continued)

OTHER PUBLICATIONS

Abramson, Ronna, "The Paperless House Closing", The Industry Standard, pp. 84-86, Jan. 15, 2001.
(Continued)

*Primary Examiner*—Zachary A Davis
(74) *Attorney, Agent, or Firm*—Ober / Kaler; Royal W. Craig

(57) ABSTRACT

A Certificate Status Service that is configurable, directed, and able to retrieve status from any approved Certification Authority (CA) is disclosed. The CSS may be used by a Trusted Custodial Utility (TCU) and comparable systems or applications whose roles are validating the right of an individual to perform a requisite action, the authenticity of submitted electronic information objects, and the status of authentication certificates used in digital signature verification and user authentication processes. The validity check on authentication certificates is performed by querying an issuing CA. Traditionally, to create a trusted Public Key Infrastructure (PKI) needed to validate certificates, complex relationships are formed by cross-certification among CAs or by use of PKI bridges. The PKI and CA interoperability problem is addressed from a different point of view, with a focus on establishing a trust environment suitable for the creation, execution, maintenance, transfer, retrieval and destruction of electronic original information objects that may also be transferable records (ownership may change hands). A TCU is concerned only with a known set of "approved CAs" although they may support a multitude of business environments, and within that set of CAs, only with those certificates that are associated with TCU user accounts. Building PKI/CA trusted relationships is not required as the CSS achieves a trusted environment by querying only approved CAs and maintaining caches of valid certificates' status.

17 Claims, 8 Drawing Sheets

| | | | |
|---|---|---|---|
| 4,264,782 A * | 4/1981 | Konheim | 705/75 |
| 4,405,829 A | 9/1983 | Rivest et al. | |
| 4,625,076 A | 11/1986 | Okamoto et al. | |
| 4,827,508 A | 5/1989 | Shear | |
| 4,853,961 A | 8/1989 | Pastor | |
| 4,893,338 A | 1/1990 | Pastor | |
| 4,977,594 A | 12/1990 | Shear | |
| 4,981,370 A | 1/1991 | Dziewit et al. | |
| 4,995,082 A | 2/1991 | Schnorr | |
| 5,003,405 A | 3/1991 | Wulforst | |
| 5,005,200 A | 4/1991 | Fischer | |
| 5,031,214 A | 7/1991 | Dziewit et al. | |
| 5,050,213 A | 9/1991 | Shear | |
| 5,136,646 A | 8/1992 | Haber et al. | |
| 5,136,647 A | 8/1992 | Haber et al. | |
| 5,163,091 A | 11/1992 | Graziano et al. | |
| 5,164,988 A | 11/1992 | Matyas et al. | |
| 5,191,613 A | 3/1993 | Graziano et al. | |
| 5,214,703 A | 5/1993 | Massey et al. | |
| 5,231,668 A | 7/1993 | Kravitz | |
| 5,241,594 A | 8/1993 | Kung | |
| 5,267,314 A | 11/1993 | Stambler | |
| 5,276,737 A | 1/1994 | Micali | |
| 5,311,596 A | 5/1994 | Scott et al. | |
| 5,315,658 A | 5/1994 | Micali | |
| 5,323,146 A | 6/1994 | Glaschick | |
| 5,339,361 A | 8/1994 | Schwalm et al. | |
| 5,363,448 A | 11/1994 | Koopman, Jr. et al. | |
| 5,371,794 A | 12/1994 | Diffie et al. | |
| 5,373,561 A | 12/1994 | Haber et al. | |
| 5,377,270 A | 12/1994 | Koopman, Jr. et al. | |
| 5,390,247 A | 2/1995 | Fischer | |
| 5,410,598 A | 4/1995 | Shear | |
| RE34,954 E | 5/1995 | Haber et al. | |
| 5,475,758 A | 12/1995 | Kikuchi | |
| 5,524,073 A | 6/1996 | Stambler | |
| 5,534,855 A | 7/1996 | Shockley et al. | |
| 5,555,303 A | 9/1996 | Stambler | |
| 5,555,307 A | 9/1996 | Le Corre et al. | |
| 5,590,199 A | 12/1996 | Krajewski, Jr. et al. | |
| 5,615,268 A | 3/1997 | Bisbee et al. | |
| 5,646,998 A | 7/1997 | Stambler | |
| 5,655,077 A | 8/1997 | Jones et al. | |
| 5,684,950 A | 11/1997 | Dare et al. | |
| 5,689,638 A | 11/1997 | Sadovsky | |
| 5,699,431 A | 12/1997 | Van Oorschot et al. | |
| 5,748,738 A | 5/1998 | Bisbee et al. | |
| 5,757,920 A | 5/1998 | Misra et al. | |
| 5,768,504 A | 6/1998 | Kells et al. | |
| 5,774,650 A | 6/1998 | Chapman et al. | |
| 5,781,629 A | 7/1998 | Haber et al. | |
| 5,793,302 A | 8/1998 | Stambler | |
| 5,818,955 A * | 10/1998 | Smithies et al. | 382/115 |
| 5,848,872 A | 12/1998 | Manes et al. | |
| 5,872,848 A | 2/1999 | Romney et al. | |
| 5,884,312 A | 3/1999 | Dustan et al. | |
| 5,892,900 A | 4/1999 | Ginter et al. | |
| 5,903,651 A * | 5/1999 | Kocher | 713/158 |
| 5,910,987 A | 6/1999 | Ginter et al. | |
| 5,915,019 A | 6/1999 | Ginter et al. | |
| 5,917,912 A | 6/1999 | Ginter et al. | |
| 5,920,861 A | 7/1999 | Hall et al. | |
| 5,922,208 A | 7/1999 | Demmers | |
| 5,936,541 A | 8/1999 | Stambler | |
| 5,937,068 A | 8/1999 | Audebert et al. | |
| 5,943,422 A | 8/1999 | Van Wie et al. | |
| 5,944,824 A | 8/1999 | He | |
| 5,949,876 A | 9/1999 | Ginter et al. | |
| 5,960,083 A * | 9/1999 | Micali | 713/175 |
| 5,974,148 A | 10/1999 | Stambler | |
| 5,982,891 A | 11/1999 | Ginter et al. | |
| 5,987,429 A | 11/1999 | Maritzen et al. | |
| 5,999,711 A | 12/1999 | Misra et al. | |
| 6,023,509 A | 2/2000 | Herbert et al. | |
| 6,038,035 A | 3/2000 | Wulforst | |
| 6,044,462 A | 3/2000 | Zubledia et al. | |
| 6,070,239 A | 5/2000 | McManis | |
| 6,085,322 A | 7/2000 | Romnet et al. | |
| 6,148,404 A | 11/2000 | Yatsukawa | |
| 6,178,511 B1 | 1/2001 | Cohen et al. | |
| 6,237,096 B1 | 5/2001 | Bisbee et al. | |
| 6,275,944 B1 | 8/2001 | Kao et al. | |
| 6,292,893 B1 * | 9/2001 | Micali | 713/158 |
| 6,301,658 B1 * | 10/2001 | Koehler | 713/155 |
| 6,304,974 B1 * | 10/2001 | Samar | 726/10 |
| 6,332,192 B1 | 12/2001 | Boroditsky et al. | |
| 6,351,812 B1 * | 2/2002 | Datar et al. | 713/182 |
| 6,367,013 B1 | 4/2002 | Bisbee et al. | |
| 6,397,329 B1 * | 5/2002 | Aiello et al. | 713/155 |
| 6,401,211 B1 | 6/2002 | Brezak, Jr. et al. | |
| 6,421,768 B1 | 7/2002 | Purpura | |
| 6,427,209 B1 | 7/2002 | Brezak, Jr. et al. | |
| 6,442,689 B1 * | 8/2002 | Kocher | 713/158 |
| 6,484,174 B1 | 11/2002 | Wall et al. | |
| 6,487,658 B1 * | 11/2002 | Micali | 713/158 |
| 6,581,059 B1 * | 6/2003 | Barrett et al. | 707/9 |
| 6,615,347 B1 * | 9/2003 | de Silva et al. | 713/156 |
| 6,766,450 B2 * | 7/2004 | Micali | 713/158 |
| 6,836,765 B1 * | 12/2004 | Sussman | 705/75 |
| 6,948,061 B1 * | 9/2005 | Dierks | 713/159 |
| 6,970,862 B2 * | 11/2005 | Kwan | 707/3 |
| 6,993,137 B2 * | 1/2006 | Fransdonk | 380/279 |
| 7,024,691 B1 * | 4/2006 | Herzberg et al. | 726/5 |
| 7,076,653 B1 * | 7/2006 | Remer et al. | 713/155 |
| 7,120,793 B2 * | 10/2006 | Hope et al. | 713/158 |
| 7,149,892 B2 * | 12/2006 | Freed et al. | 713/151 |
| 7,177,839 B1 * | 2/2007 | Claxton et al. | 705/44 |
| 7,337,315 B2 * | 2/2008 | Micali | 713/157 |
| 7,349,912 B2 * | 3/2008 | Delany et al. | 707/101 |
| 7,356,693 B2 * | 4/2008 | Kivinen et al. | 713/158 |
| 7,475,151 B2 * | 1/2009 | Delany et al. | 709/229 |
| 7,526,644 B2 * | 4/2009 | Kocher | 713/158 |
| 7,529,928 B2 * | 5/2009 | Micali | 713/158 |
| 2001/0002485 A1 | 5/2001 | Bisbee et al. | |
| 2002/0019838 A1 | 2/2002 | Petrogiannis | |
| 2002/0029200 A1 * | 3/2002 | Dulin et al. | 705/67 |
| 2002/0038318 A1 | 3/2002 | Cochran et al. | |
| 2002/0062438 A1 | 5/2002 | Asay et al. | |
| 2002/0078159 A1 | 6/2002 | Petrogiannis et al. | |
| 2002/0091651 A1 | 7/2002 | Petrogiannis et al. | |
| 2002/0128940 A1 | 9/2002 | Orrin et al. | |
| 2002/0184217 A1 | 12/2002 | Bisbee et al. | |
| 2003/0070070 A1 * | 4/2003 | Yeager et al. | 713/157 |
| 2003/0074555 A1 * | 4/2003 | Fahn et al. | 713/156 |
| 2003/0079124 A1 * | 4/2003 | Serebrennikov | 713/156 |
| 2003/0079125 A1 * | 4/2003 | Hope et al. | 713/156 |
| 2003/0088771 A1 * | 5/2003 | Merchen | 713/175 |
| 2003/0126433 A1 * | 7/2003 | Hui | 713/158 |
| 2003/0130960 A1 * | 7/2003 | Fraser et al. | 705/75 |
| 2003/0167392 A1 * | 9/2003 | Fransdonk | 713/156 |
| 2004/0162984 A1 * | 8/2004 | Freeman et al. | 713/175 |
| 2005/0055548 A1 * | 3/2005 | Micali | 713/158 |
| 2005/0114653 A1 * | 5/2005 | Sudia | 713/158 |
| 2005/0138363 A1 * | 6/2005 | Fox et al. | 713/156 |

FOREIGN PATENT DOCUMENTS

| | | |
|---|---|---|
| EP | 0 892 521 A2 | 1/1999 |
| WO | WO 97 12460 A1 | 4/1997 |
| WO | WO 01 413 60 A2 | 6/2001 |

OTHER PUBLICATIONS eOriginal, "The Use of Electronic Documents as Originals, Using the eOriginal™ system to Produce Reliable Evidence" pp. 1-30, Nov. 18, 1999.

Fiori, Rod, "eSigned, eSealed & dlivered: Keeping Pace with Electronic Transactions Law", No. 5, pp. 60-76, May 2001.

IntelliSafe Technologies, "IntelliSafe Vault is a technology platform that gives applications the functionality to produce authoritative documents in a paperless environment", Retrieved from the Internet: <http://www.intellisafe.com> 2001-2002.

Kormann, David P., et al. "Risks of the Passport Single Signon Protocol", IEEE Computer Networks, vol. 33, pp. 51-58, 2000.

Netegrity, Inc., [online] [retrieved on Apr. 11, 2001] Retrieved from the Internet: <http://www.netegrity.com>.

"Pijnenburg Securalink Provides the Missing Link to Internet Transaction Security" [online], [retrieved on Feb. 14, 2001] Retrieved from the Internet: <URL http://www.securealink.com/press02.html>.

Prandini, M. "Efficient Certificate Status Handling within PKIs: an Application to Public Administration Services," Computer Security Applications Conference, 1999 (ACSAC '99), Proceedings, 15$^{th}$ Annual Phoenix, AZ USA, Dec. 6-10, 1999, Los Alamitos, CA, USA, IEEE Comput. Soc., US, Dec. 6, 1999, pp. 276-281, XP010368618.

* cited by examiner

Signature Block Syntax Example

Free form example of data elements making up a digital signature
where the signature is applied to multiple message fragments and a
date/time stamp. This example is not meant to be taken literally, but
is meant to be illustrative of the type of syntax that may be used.

```
<Signature>
   <SignedInfo>
      <Signature Method
      Algorithm = RSA (1024bit)/>
      <ReferenceContent>
         <ReferencetoFragment1>
            <HashAlgorithm = SHA-1>
            <HashValue>A62E…</HashValue>
         </Reference>
         <ReferencetoFragment2>
            <HashAlgorithm = SHA-1>
            <HashValue>F0BC…</HashValue>
         </Reference>
         <Authenticated Data>
            <Date>…</Date>
            <Time>…</Time>
         </Authenticated Data>
         <HashAlgorithm = SHA-1>
         <CumulativeHashValue>6E31…</CumulativeHashValue>
      </ReferenceContent>
   </SignedInfo>
   <SignatureValue>602C…</SignatureValue>
   <Unauthenticated Data>
      <
   </Unauthenticated Data>
   <KeyInfo>
      <X509ParsedData>
         <Sequence of X.509 Data Elements>
         <X509Serial #
         <X509Issuer name
         <..
         <X509Subject name
         <..
         </
      </X509ParsedData>
      <X509Certificate>MIIE…</X509 Certificate>
   </KeyInfo>
</Signature>
```

The <CumulativeHashValue> is the applied to HashValues one or more
fragment or the total content and any Authenticated Data.

Figure 4

SYSTEM AND METHOD FOR A REMOTE ACCESS SERVICE ENABLING TRUST AND INTEROPERABILITY WHEN RETRIEVING CERTIFICATE STATUS FROM MULTIPLE CERTIFICATION AUTHORITY REPORTING COMPONENTS

This application is a continuation-in-part of U.S. patent application Ser. No. 09/737,325 filed on Dec. 14, 2000, now U.S. Pat. No. 7,162,635 which is a continuation of International Application No. PCT/US00/32746, filed on Dec. 1, 2000, that designates the United States, and a continuation-in-part of U.S. patent application Ser. No. 09/452,928, filed on Dec. 2, 1999, now U.S. Pat. No. 6,367,013, which is a continuation-in-part of U.S. patent application Ser. No. 09/072,079 filed on May 4, 1998, now U.S. Pat. No. 6,237,096, which is a continuation-in-part of U.S. patent application Ser. No. 08/528,841 filed Sep. 15, 1995, now U.S. Pat. No. 5,748,738, which is a continuation-in-part of U.S. patent application Ser. No. 08/373,944 filed Jan. 17, 1995, now U.S. Pat. No. 5,615,268, all by Bisbee et al. This application claims priority to the filing date of U.S. Provisional Patent Application No. 60/397,178 that was filed on Jul. 18, 2002. These patents and applications are incorporated in this application by reference.

BACKGROUND

Applicants' invention relates to systems and methods for providing a verifiable chain of evidence and security for the creation, execution, maintenance, transfer, retrieval and destruction of electronic original information objects, such as Electronic Original™ documents.

This invention advantageously uses Applicants' Trusted Custodial Utility that holds electronic original records and holds comparable system roles as a virtual electronic vault in validating the right of an individual to perform a requisite action, the authenticity of submitted electronic information objects, and the status of the authentication certificates used in the digital signature verification and user authentication processes. Such TCUs and operations are described in U.S. Pat. No. 5,615,268; U.S. Pat. No. 5,748,738; U.S. Pat. No. 6,237,096; and U.S. Pat. No. 6,367,013.

The following list of abbreviations is used in this description:

Abbreviations

| | |
|---|---|
| CA | Certification Authority |
| CRL | Certificate Revocation List |
| CSS | Certificate Status Service |
| HTML | Hypertext Markup Language |
| ID | Identification |
| IETF | Internet Engineering Task Force |
| ITU | International Telecommunications Union |
| LDAP | Lightweight Directory Access Protocol |
| OCSP | Online Certificate Status Protocol, IETF-RFC 2560 X.509 Internet Public Key Infrastructure Online Certificate Status Protocol - OCSP, June 1999. |
| PIN | Personal Identification Number |
| PKCS | Public-Key Cryptographic Standards |
| PKI | Public Key Infrastructure |
| PKIX | Public Key Infrastructure (X.509) |
| S/MIME | Secure Multi-Purpose Internet Mail Extensions |
| SCVP | Simple Certificate Validation Protocol, Draft-IETF-PKIX-SCVP-06, July 2000 |
| SSL | Secure Socket Layer |
| TCU | Trusted Custodial Utility |
| UETA | Uniform Electronic Transactions Act |
| XML | Extensible Markup Language |

Legal standing for electronic signatures applied to information objects is made possible by the passage of U.S. Electronic Signatures in Global and National Commerce Act (ES-IGN) legislation and U.S. state laws modeled after the UETA drafted by the National Conference of Commissioners on Uniform State Laws and approved and recommended for enactment in 1999 that has resulted in government, banking and electronic commerce activities aimed at realizing the efficiency and economies of these potentially wholly electronic transactions.

PKI and the CA are the base elements of digital signature technology used in creating electronic source records. A PKI is a collection of CAs where trust is established between users and user organizations by creating either a hierarchical relationship between CAs or through cross-certification amongst cooperating CAs. A CA is empowered to issue authentication certificates that bind an individual's or entity's identity to his or its public key (verifying), where only the individual is given access to the matching private key (signing). At the time of this application, certificates normally conform to the ITU X.509 certificate standard and are themselves digitally signed by the issuing CA. Such certificates are depicted in FIG. 10 of U.S. Pat. No. 6,237,096, for example, that is cited and incorporated above. These authentication certificates contain a serial number, identifying information of the subject (user) and issuer (CA), the certificate's validity period (date and time before and after which it may not be used), the subject's public key, and cryptographic algorithm information needed to create and verify digital signatures.

To create a digital signature, an information object is hashed (processed using a one-way cryptographic function that can detect as little as a one bit alteration in the object) and the hash is then encrypted using the individual's private (secret) key. Digital signature verification is achieved by reversing this process. The digital signature is decrypted using the individual's public key retrieved from their authentication certificate and the result is compared to a re-hash of the original information object. These processes may vary when using different digital signature algorithms. Digital signatures are only as reliable as the trust that exists between the relying parties and the issuing CAs; and the level of assurance achieved by the physical controls, practices and procedures implemented by the CAs.

The purpose of PKI technology is to create and maintain both a secure and trusted environment for communicating parties. Such parties rely on the PKI to establish the identity of users and to notify them when a user's certificate is no longer viable. Certificates are revoked when an individual leaves an organization, when a replacement certificate is issued, or when a signing key is lost, stolen or compromised. Vendors report certificate status using a wide variety of methods. These diverse methods make it more difficult for users to obtain certificate status for other users.

The formation of a trust relationship and interoperability is dictated by PKI certificate and security policies and their enforcement. The certificate policy determines the level of personal vetting (i.e., the process for validating appropriateness of certificate request information and the identity of the intended certificate recipient) required (e.g., two forms of picture ID, credit check) to gain approval for issuance of a certificate. The security policy dictates the physical, procedural and process controls needed to support the application environment.

There are two prevalent models for creating and organizing CAs. The first is a hierarchical CA model that resembles an inverted tree whose top is the root CA. The root CA signs its immediate subordinate CAs' certificates. These CAs then sign their subordinate CAs' certificates, and so on. These relationships create certificate chains that form branches of the tree. Two CAs prove that a trust relationship exists between them by "walking" their respective certificate chains until a common node is reached. CAs may be grouped and associated with one or more service delivery channels, industry verticals, organizations or enterprises.

In the second model, a CA is created for a single enterprise and provides CA services to one or more entities within that enterprise. An enterprise CA does not normally have any pre-established trust relationships with any CA of another enterprise. Explicit action must be taken to allow interoperability in the form of CA cross-certification, whereby two or more CAs that agree to trust one another sign each other's certificate and use these cross-certified certificates during digital signature verification. Certificates issued by one CA can then be validated by the other cross-certified CA and its users.

CAs revoke certificates when, among other reasons, the information contained therein becomes invalid, when the user's private key becomes compromised, or when it is necessary to terminate a user's certificate-based application privileges. CAs cannot simply delete or retrieve a certificate from its owner if it is already in the owner's possession. Instead, the certificate is marked as "revoked" in the CA's database and the certificate status is published. Users of the PKI can then learn of a certificate's validity by requesting certificate status from the issuing CA or identified status repository (directory).

An early method used to report certificate status was by way of publication of a list of a CA's revoked certificates, known as a CRL. CRLs are downloaded by applications and relying parties to determine whether a particular user's certificate has been revoked and by extension whether that user's digital signature is still valid or not. With time, CRLs get longer, incurring both communication and data processing overhead. An additional shortcoming of this approach is that CRLs are often published at infrequent intervals (e.g., once or twice a day). For this reason, CRLs are often immediately out-of-date after publication. Revoked certificates are only removed from CRLs after certificate expiration.

A PKI bridge is a method of providing interoperability between CAs by coordinating distribution of CRLs. Such a bridge is a central CRL repository that in effect joins a set of CAs that agree to accept each other's certificates and security policies. All CAs post their CRLs to the bridge. This allows for centralized validation of any individual's or entity's certificate. If the certificate has not been previously revoked, then it is still considered valid. The biggest disadvantage to PKI bridges is that they must be reachable by any CA or user relying on the bridge for certificate status. The bandwidth, computation, and storage requirements may be costly.

A more recent method for obtaining certificate status is the IETF OCSP, which makes a direct database query that can provide real-time certificate status. However, some vendors have implemented OCSP responders that are based on CRLs. Certificate status reported by this type of responder is only as timely as the CRLs on which they are based. Attempts to achieve real-time certificate status, such as the IETF SCVP continue to be developed. At the time of this invention, mixing and matching of status checking methods has not been practical in an open PKI environment.

Any approach to certificate validation is an all-or-nothing decision for the CA that issued the certificates. All users who are issued certificates by one of the member CAs are valid/enabled unless their certificate has been suspended or revoked or has expired. The common theme for controlling participation is whether a certificate gets issued. Issuance is governed by certificate and security policies and business rules.

The trust environment can range from fully open, where anyone able to pay the price of admission is issued a certificate, to closed or bounded, by requiring membership in an enterprise or community of interest. In either case, CA certificate and/or security policies govern whether interoperability is allowed.

Applicants' invention approaches the PKI and CA interoperability problem from a totally different point of view from those described above. Applicants' focus is on establishing a trust environment suitable for the creation, execution, maintenance, transfer, retrieval, and destruction of electronic original information objects that may also be transferable records (ownership may change hands). To realize these objectives, the system controlling an electronic original or authoritative copy must make it possible to identify the original from any copy thereof. As with paper originals, there can only be one original. Examples of transferable records are electronic negotiable instruments and securities. An electronic original record may be any source record, whether it qualifies as a transferable record or not. Transfer of electronic original records between systems must take place using methods that guarantee that only one original exists.

This invention creates an electronic original record by placing custody of that record in the hands of a trusted independent party, functionary or TCU operated for the benefit of the record's owner. Creating a trust environment is necessary, but is not sufficient for maintaining electronic source records. For the purposes of this invention, a trust environment is created by formation of a community of interest that has a closed or bounded membership and where the identity of prospective members, organizations and their users is assured by using appropriate vetting procedures that govern the granting of admission to the community. Further, an individual's organization, participation, role, and attributes are defined at the time of enrollment with the TCU. Individuals must be uniquely identified to the system and in their authentication certificate. In addition, it must be possible to remove individuals and organizations from the community and to make this action known to other members of the community. Traditional approaches to CA interoperability do not adequately achieve these objectives.

Vetting at a minimum requires that an organization and/or individual be sponsored by a known member of the community. In addition, a Dun and Bradstreet-like rating for organizations or an Equifax-like credit check for individuals, or an equivalent credit and payment history, may be utilized to evaluate acceptability of potential business partners, clients and customers. Both the vetting organization and its sponsored users must be deemed trustworthy before TCU enrollment is permitted. After an organization agrees to the contractual terms defining membership, its sponsored individuals will each be given a unique identifier and password that will enable them to access the TCU.

Once an individual is enrolled with one or more TCUs, they can be named as a participant to a transaction by the owner of that transaction and given specific access to all or an identified subset of source records based on their identity, role, and/or responsibility. To facilitate identification and authentication and to enable the transactions to take place in a totally electronic form, a selected subset of this identifying information is included in the participant's authentication certificate. The authentication certificate binds the user's identity with their public-key used to validate digital signatures generated using their matching signing private-key.

A certificate or security policy addresses the proof-of-identity requirements (e.g., two forms of picture ID, credit check, personal introduction) needed before issuing a certificate. This certificate will be bound to the user's TCU account if required for digital signing authority. The linkage shall include a subset of certificate data elements that uniquely identify the user (e.g., certificate ID, issuing CA name, user common name). Once associated with a user's account, the certificate can be used in conjunction with his or its digital signature to afford the proof-of-identity needed to enable a predetermined set of authorized actions and to verify the user's digital signature on submitted information objects. This is especially true when the owner or owner's agent controlling a set of electronic records instructs the TCU to transfer ownership (i.e., an internal transaction) and/or to transfer custody (i.e., an external transaction) of the electronic records to another TCU.

As described earlier, authentication certificates and public-key cryptography are used to support both user authentication and digital signature verification. The certificate is digitally signed by the issuing CA, a process by which the identity of the recipient is sealed with their public key. The CA asserts, in issuing a certificate, that the individual identified in the certificate is the holder of the matching private key used to digitally sign information objects or fragments thereof.

This invention differs from other PKI-based e-commerce solutions since the PKI is only viewed as enabling and is not the sole basis of the trust environment. Sponsorship, contracting for membership, and enrollment are the principal factors. Although the certificate and use of public-key cryptography are viewed as enabling technology, certificates must uniquely identify and be tied to the specific users before they can be bound to that user's TCU account.

Where certificates are employed, the account may only be activated once this binding between certificate and user account is completed. This binding may be as simple as adding the Certificate ID and Issuing CA to the user's account information or may use other information conveyed by the certificate such as components of the user's distinguished name (see ITU X.509 standard). The binding information may be conveyed in an enrollment form or extracted directly from the certificate as per TCU system security policy. A correspondence check may be used to ensure that the user description in the certificate matches that in the enrollment data whenever the certificate is used. The user's certificate is signed by the issuing CA and its integrity and authenticity are validated using the issuing CA's certificate and public key. The collective set of components used for identification must be provably unique. Once this TCU account and user certificate binding is accomplished, the TCU need only know where to go to check certificate status.

In CA centric environments, a single PKI, cross-certification, or creation of PKI bridges (a complex system that performs certificate status checking where multiple vendor products are used by numerous CAs) is required for interoperability. The common element is that all certificates are of equal value. Certificates may convey different trust levels and applications in an open environment must have the ability to interpret and use these trust levels differently. This philosophy can be characterized as "we will build roads that will take you anywhere you want to go". Users are vetted upon CA enrollment using a variety of criteria (e.g., a credit check, means of payment, cost of the certificate).

A TCU, conversely, is only concerned with a known set of "approved CAs" and within that set only those certificates that are associated with its user accounts. Any other certificate will be ignored. This philosophy can be characterized as "the only roads that will be open to you will be those needed to conduct your business". Users are vetted twice, once to satisfy the CA certificate policy and a second time to prove that there is a business need for them to be enrolled with a TCU. Business rules enforced by the TCU can accommodate certificates that are issued at different trust levels.

SUMMARY

To date, all certificate status reporting services use a single means of reporting certificate status, be it CRLs, OCSP, LDAP, etc. This invention differs in that it enables interoperability with any CA or PKI for the purpose of retrieving and reporting certificate status. For the most part, it also reduces reliance on real-time continuous connectivity between the systems or TCUs and the CA certificate status reporting elements, by caching certificate status.

In one aspect of Applicants' invention, a method of providing a CSS for checking validities of authentication certificates issued by respective CAs includes the steps of identifying information needed for retrieving a status of an authentication certificate from an issuing CA that issued the authentication certificate; configuring a connector based on the identified information for communicating with the issuing CA; communicating with the issuing CA according to the configured connector; and retrieving the status of the authentication certificate. The issuing CA and the connector are designated on a list of approved CAs in a configuration store.

A local date and time may be checked for whether they fall within a validity period indicated in the authentication certificate validity period. The issuing CA may be included in the list of approved CAs by vetting and approving the issuing CA according to predetermined business rules, and if the issuing CA is vetted and not approved, the issuing CA may be designated on a list of not-approved CAs in the configuration store. Vetting and approving the issuing CA may include registering a representation of a trusted authentication certificate with the CSS and adding at least the representation, status and a time-to-live data element to a local cache memory. A connector is then configured for retrieving the added status when the status of the trusted authentication certificate is queried. Communicating with issuing CAs may also be done according to a sequence of connectors.

The method may further include checking a local cache memory for the status, and if the status is found in the local cache memory and the local date and time are within the validity period, retrieving the status from the local cache memory. If the status is not found in the local cache memory or if the local date and time are not within the validity period, the CSS establishes a communication session with a certificate status reporting component of the issuing CA, composes a certificate status request according to the configured connector, retrieves the status from the certificate status reporting component, closes the communication session with certificate status reporting component, and adds at least the authentication certificate's identification, status, and time-to-live to the local cache memory.

Certificate status may be indicated by a CRL, and according to a publication schedule of the issuing CA, the CSS retrieves the CRL from a certificate status reporting component listed in the configuration store, the CSS clears a cache memory associated with the issuing CA, and the CSS determines the status of the authentication certificate from the CRL and stores the status in the cache memory associated with the issuing CA.

Certificate status may also be indicated by a Delta Certificate Revocation List ("ΔCRL"), and upon notification by the issuing CA that a ΔCRL is available, the CSS retrieves the ΔCRL from a certificate status reporting component listed in the configuration store; if the ΔCRL is a complete CRL, then the CSS clears a cache memory associated with the issuing CA, determines the status from the CRL, and stores the status in the cache memory; and if the ΔCRL contains only changes occurring after publication of a full CRL, the CSS determines the status from the ΔCRL, and stores the status in the cache memory.

In another aspect of Applicants' invention, a method of retrieving a status of an authentication certificate issued by an issuing CA in response to a query from a TCU to a CSS to validate the authentication certificate's status includes the steps of locating and reporting the status if the status is present and current in a cache memory of the CSS; and otherwise, performing the steps of obtaining a status type and retrieval method from a CSS configuration store; if the status type is CRL and the status is not found in the cache memory, then reporting the status as valid; if the status type is not CRL, then composing a certificate status request according to the status type; establishing a communication session with the issuing CA; retrieving the status from a status reporting component of the issuing CA using the obtained retrieval method and ending the communication session; interpreting the retrieved status; associating, with the interpreted retrieved status, a time-to-live value representing a period specified by a CSS policy for the status type; adding at least the authentication certificate's identification, status, and time-to-live values to the cache memory; and reporting the status to the TCU in response to the query.

In yet another aspect of Applicants' invention, a CSS for providing accurate and timely status indications of authentication certificates issued by issuing CAs includes providing a status of an authentication certificate as indicated by a CRL when the certificate's issuing CA uses CRLs for indicating status. Otherwise, the status as indicated by a cache memory when the cache memory includes a status and a time-to-live data element is not exceeded is provided. If the time-to-live data element is exceeded, the status is cleared from the cache memory, and the status is requested and retrieved using a real-time certificate status reporting protocol when the status is not in the cache memory. At least the certificate's identification, status, and time-to-live data element are added to the cache memory, and the retrieved status is provided.

A status use-counter data element may be added to the cache memory and incremented or decremented every time the certificate's status is checked. If the status use-counter data element passes a threshold, then the status is provided and the cache memory is cleared with respect to the status. A status last-accessed data element may also be added to the cache memory, and the status last-accessed data element in conjunction with the status use-counter data element enables determination of an activity level of the certificate's status.

When a request is made to the CSS to retrieve a status of a new certificate and the cache memory has reached an allocated buffer size limit, the CSS searches the cache memory for a last-accessed data element indicating an oldest date and clears the respective cache memory entry; and the CSS then retrieves the requested status, places it in the cache memory, and provides the requested status.

In yet another aspect of Applicants' invention, a method of executing a transaction between a first party and a second party by transferring control of an authenticated information object having a verifiable evidence trail includes retrieving from a trusted repository an authenticated information object that includes a first digital signature block having a digital signature of a submitting party and a first authentication certificate relating at least an identity and a cryptographic key to the submitting party, executing the retrieved authenticated information object by the second party by including in the retrieved authenticated information object the second party's digital signature block, and forwarding the executed retrieved authenticated information object to a TCU.

The TCU verifies the digital signatures and validates the authentication certificates associated with the digital signatures by at least retrieving status of the authentication certificates from a CSS. The TCU rejects a digital signature block if the respective digital signature is not verified or the status of the respective authentication certificate is expired or is revoked, and if at least one signature block in the information object is not rejected, the TCU appends the TCU's digital signature block and a date and time indicator to the information object and takes control of the object on behalf of the first party.

BRIEF DESCRIPTION OF THE DRAWINGS

The various features and advantages of Applicants' invention will become apparent by reading this description in conjunction with the drawings in which:

FIG. 4 illustrates an extensible syntax for a signature block containing the example data elements where a digital signature is being applied to information object fragments and attached data (authenticated attributes);

DETAILED DESCRIPTION

Figure 1:
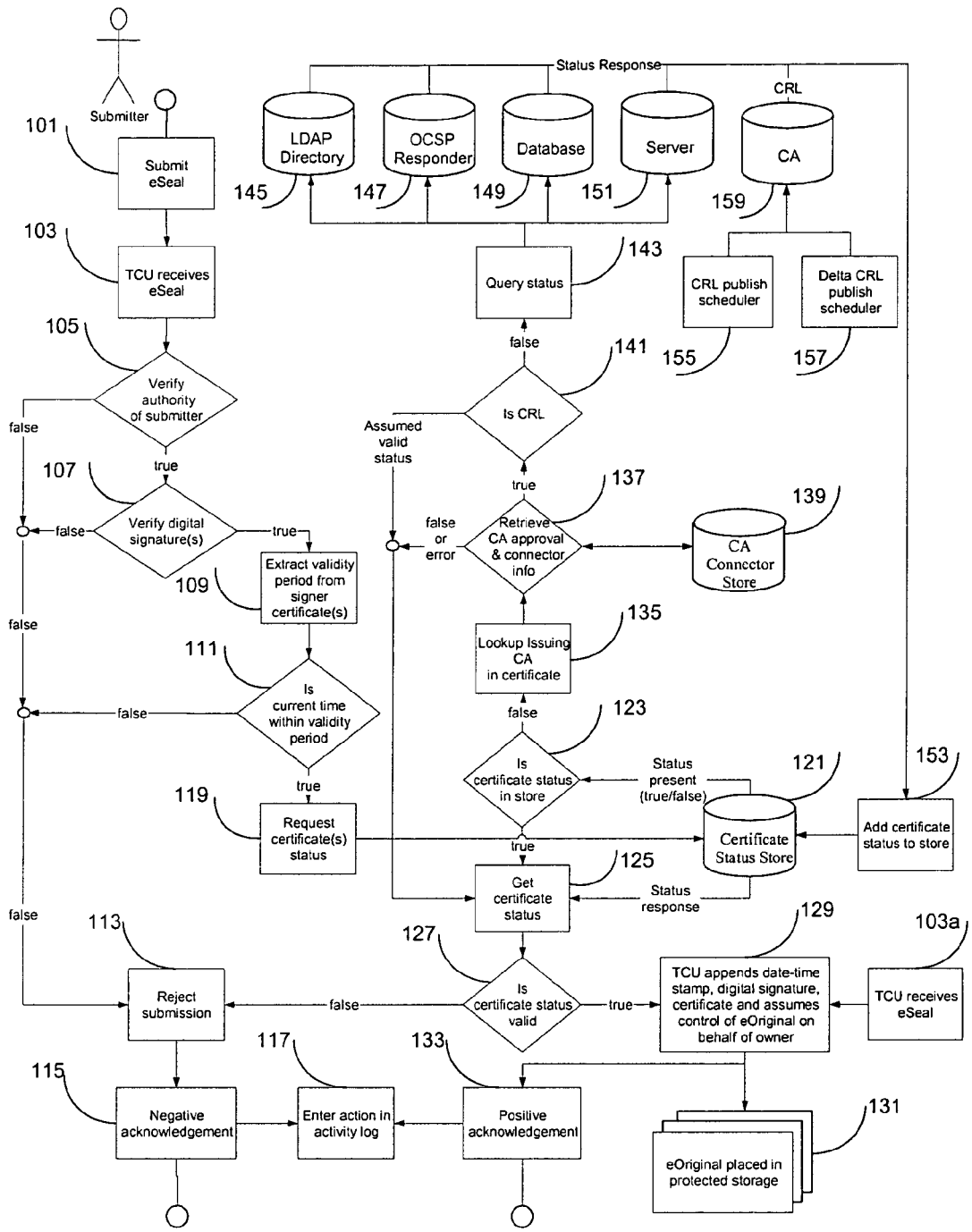
FIG. 1 illustrates a TCU electronic information object validation process that employs the CSS.

The certificate status check is a critical element to a system or TCU acceptance of any electronic information object submission. In order for a submission to be accepted, the certificate status must be reported as valid. Querying for certificate status normally requires that communications take place between the TCU and the source of certificate status. The frequency of these communications will grow in proportion to the number of TCU submissions.

Checking of certificate status may be a real-time requirement and status queries are performed on every submission. However, status may not be updated in real-time as is the case with CRLs. All CRLs are published at specified intervals, normally once or twice daily. CRL retrieval and repeated parsing can have a negative impact on system performance. This invention significantly reduces the direct computational and communication requirements by off-loading the bulk of the work to a CSS. A single certificate status protocol is implemented between the TCU and the CSS. This status protocol may have attributes similar to the IETF OCSP that allows an application to query a CA for the status of a single certificate and thus minimize processing overhead.

The CSS is provided with and maintains sufficient information on the location, the means of communication, and the means of processing certificate status for every CA that it needs to interoperate with. The CSS therefore makes it possible to stabilize and optimize the application design. The CSS advantageously parses and caches certificate status to minimize status response time to a TCU status query. The CSS therefore eliminates the need for any of the traditional forms of PKI interoperability. Potential compromise recovery is greatly enhanced since a TCU user account can easily be deactivated or a set of users eliminated by removing the CA from the CSS list of approved CAs.

Use of Authentication Certificates:

After logging into the TCU a participant may be asked to further authenticate themselves though use of public key cryptography and their authentication certificate. Such authentication may be associated with secure session establishment, requests for TCU services or the digital signing and submission of an electronic information object.

Before anyone can interact with a TCU, four conditions must be met: 1) they must first be enrolled as a system user, 2) they must have been issued and be in possession of a public-key pair and their matching authentication certificate if they are granted more than read-only access, 3) certificates must be issued by an approved CA, and 4) the user's certificate must not have expired or be reported as inactive or revoked. This last condition normally requires that the TCU direct a query to the issuing CA to retrieve certificate status. Because there are a wide variety of standards and CA implementations for reporting certificate status, this is not an easy or simple task.

As stated in the background section, normally some form of PKI interoperability is required when multiple CAs or PKIs are involved. This invention eliminates this need by creating a Certificate Status Service. CA cross-certification or bridging is unnecessary as the only knowledge needed by the CSS is the list of approved issuing CAs, their IP addresses or the like, and their means of reporting certificate status.

To retrieve certificate status, a connector or program module is defined for each certificate status method. Every authentication certificate contains both subject (user) and issuer (CA) fields. The issuer field is used to direct a TCU query to the CSS that then checks its cache for the presence of the certificate's status. If status is present in the CSS cache, it is returned to the TCU. If status is not present, the CSS will invoke the appropriate connector to retrieve the certificate's status. Any number of methods will be used for reporting and retrieving certificate status: LDAP, OCSP, CRL, etc.

To perform any TCU action, the user must first log into a TCU. Once successful, the user can create or select a transaction if they were granted such authority. If they have permission to submit electronic information objects, they may now do so. Upon receipt of an electronic information object, the TCU performs the necessary digital signature validation steps. A certificate status query will be composed and sent to the CSS. If a valid status is returned, the TCU will accept and store the submission as the authoritative copy, otherwise it will be rejected.

Digital Signature Processing and Certificate Status Checking:

Digital signatures may be applied to one or more fragments or the total content of an information object. Digital signatures may belong to the parties to the transaction or to agents who enable the transaction to achieve a state or status within the context of a business process. Digital signatures may in fact be applied to additional information relating to the task being performed. One such example might be the county recorder's notation on a property deed. Another might be the application of the signature of the party attesting to the authenticity of the information objects being submitted to a TCU. In this latter instance, the submitter is said to wrap or seal the information object in that their digital signature is applied to the full content, preventing any subsequent modification.

Whenever a digital signature is applied, the signer will be requested to affirm their intent to be bound by their digital signature. This commit action, that is required by recent legislation, may take the form of readable text in a display window or splash screen, and may require invocation of a graphical button and/or logon to a cryptographic token that is also a cryptographic key and certificate store. The actual demonstration of said willingness to commit is through the use of a trusted application that computes the user's digital signature using the selected content and combines it with their authentication certificate to form a signature block. The signature block may also contain authenticated and unauthenticated data elements. Any authenticated data elements that are included in the digital signature computation, such as rationale for signing or local date-time, are protected by the digital signature. Unauthenticated data elements are added after the signature computation and are not protected. FIG. 4 shows a sample syntax that contains the data elements and layout of a signature block. It is not to be interpreted literally as it is only meant to be an illustrative example.

The information object and any signature blocks may be advantageously placed in a wrapper (S/MIME) or at tags in an extensible information syntax (XML, HTML, XHTML) for handling convenience and to facilitate information processing. This data structure is then sent to the TCU for validation. Alternatively, the signature block(s) may be sent independently to the TCU to be affixed to the actual source record which never leaves the TCU. In the latter case, each signature block is validated separately.

The process for digital signature validation differs at the time of submission, from that performed thereafter. A four-step validation is performed the first time the TCU sees a digital signature: 1) verify the digital signature, a process that proves that the content protected by the digital signature has not been altered during transmission; 2) check that the current TCU time falls with the allowable validity period of the individual's authentication certificate ("not before", "not after"); 3) request and retrieve certificate status from the issuing CA, CRL distribution point, or another approved source of certificate status using the locally assigned CSS; 4) validate that the TCU user account information agrees with that conveyed in the certificate and that the requested action is authorized in the TCU rules database. For a submitter of the information object, the process adds one additional step. This fifth step checks that the submitter's identity matches that of the party who established the current session with the TCU. If all tests succeed, the action is allowed and/or the information object is accepted and held by the TCU on the behalf of its owner. If any step fails, remedy is initiated.

After this initial certificate status check, the trust environment of the TCU maintains the authenticity and integrity of all held information objects. It is not anticipated that any additional certificate status check will be needed unless a new version of the document is submitted.

Two aspects of this invention differ from the normal course of PKI implementation. The first is that this invention is based on the existence of an application, namely the TCU (or any application/system requiring certificate status validation) and its ability to create and maintain electronic original source records. The second is that "issuing CA" need only be identified as complying with the policies governing the trust environment and that neither CA cross-certification nor PKI bridging is required. The necessary justification for "issuing CA" inclusion is a documented business relationship. During the TCU enrollment process, a user account is created that references user specific certificate information that in effect binds the user account with the user's authentication certificate.

TCU Use:

Typically once an organization agrees to utilize the services of a TCU, control over access to that organization's transactions is granted to agents of that organization. The organization's agents then identify a set of individuals whom they will empower to perform selected actions with regard to the organization's transactions. All actions require that the user have an account with the TCU, that the account be activated, and that the user have a logon identity and be able to provide an appropriate password or response to a challenge phrase. In addition, each transaction, which is composed of a set of versioned electronic original source records, has a set of permissions that govern user access at different steps in the business process. This is exemplified by the granting and removal of rights to transaction records as the transaction proceeds though the normal course of business, i.e., inception through permanent retention or destruction. If permitted, only logon to the TCU is required to view an electronic source record. However, any systems level action or the introduction or changing of an electronic source record requires the individual to either further authenticate themselves by using public key cryptography or by applying their digital signature and authentication certificate. In all instances, the identity of the individual must be validated. Where digital signatures are employed, this entails: 1) that the user has appropriate access permissions, 2) decrypting the digital signature and verifying the contents over which the underlying hash or message digest has been applied have not been altered, 3) checking that the time of submission falls within the certificate validity period, and 4) checking that the user certificate is still valid.

Certificate status checking requires that the issuing CA or a certificate status responder be queried. Since this step must be taken with every authenticated action or electronic source record submission, communication bandwidth may become excessive and potential exists for delays, backlogs, and rejections due to unanswered or slow status responses. This invention addresses these and other high assurance aspects of operating a TCU and ensuring the validity of all parties interacting with the TCU.

In the highly assured environment in which the TCU is operated, certificate status checking is only needed when a service is requested by a qualified user. For information objects, certificate status need only be checked at the time of submission. If all digital signatures are determined to be valid, the information object is deemed authentic thereafter. Security and procedural practices and methods are in place at the TCU to prevent malicious actions and hardware failures that result in unauthorized document alteration or loss. Every submission results in creation of a new version of an electronic source record. The TCU is charged with maintaining knowledge as to which is the latest version of the source record. This version may be identified as the electronic original and as a transferable record. The TCU demonstrates its assumption of control of an original source record by adding a reliable date-time stamp to the source record and then by applying its digital signature and appending its certificate. A wrapper may be applied to the source record for security and processing expediency. Although this versioning process creates a standalone authenticated trail-of-evidence and custody, separate redundant audit records are maintained for corroboration.

Applicants' CSS overcomes the described limitations that persist today with PKI and e-commerce. Source information required to obtain certificate status from member CAs is registered with the CSS when they are created. Source information for foreign approved CAs may be entered during the user enrollment process. CSS retrieval information is required for every certificate status source. There are several types of certificate status sources and the CSS is required to have a connector or method for each type registered.

One method used by some CAs to convey certificate status is the CRL, which includes a list of revoked certificates and the reason for their revocation, the issuer of the CRL, when the CRL was issued, and when the next version of the CRL will be published. Every CRL is signed by the issuing CA or a designated signer to assure its integrity and authenticity. Certificates are removed from the CRL once their validity period is exceeded.

Where CRLs are used, the CSS retrieves the latest rendition of the CRL from the CA distribution point, e.g., an X.509 v2 CRL profile (IETF RFC2459, January 99), validates its signature, parses it, and creates a cache to store the results. The CSS uses a CA's CRL publication interval to govern when it performs the next CRL download. Every CRL contains a validity field that is normally set to allow some leeway in performing downloads. This allows for communications congestion and CA downtime and will force the CSS to require remedial action if this interval is exceeded. Such remedy may include revalidating any submissions that are associated with a newly added revoked certificate. Each new CRL supersedes the previously loaded CRL. The exception to this rule is for delta CRLs procession. The contents of a delta CRL are appended to the current cache contents. The delta CRL Base CRL Number refers to the most recent full CRL issued. Delta CRLs are published at shorter intervals (minute, hour) and only when a certificate revocation has occurred since the last full CRL. The CSS is responsible for retrieving CRLs and delta CRL based on publication interval or notification.

A second method used by CAs to distribute certificate status is the OCSP. Where OCSP is used the CSS queries the OCSP responder when asked for certificate status. OCSP responses are signed to guarantee their integrity and authenticity. The CSS parses the OCSP response and adds certificate details and status to another cache. A time-to-live flag, determined by local TCU security policy, is included with and determines when the entry will be removed from the cache. This feature is aimed at minimizing communications overhead when several information objects are uploaded by the same party/entity to the TCU in a short interval. The time-to-live flag will usually be significantly shorter (e.g., 5 minutes) than the normal CRL publishing interval (twice daily, daily). The CSS may check certificate status again, if more than one information object was processed, prior to purging certificate status from the cache to ensure that certificate revocation has not occurred. If certificate revocation has occurred during the time-to-live interval, then the owner organization point of contact must be notified. Several other query methods exist, but will not be described for brevity. Be it understood that they will each require a connector and potentially a separate cache when they are utilized.

FIG. 1 shows the process flow for creating an electronic original. For the purposes of description, the information object is assumed to be a sales contract. A copy (unexecuted) of the electronic information object is retrieved from the TCU or from a document preparation system and is digitally or holographically (handwritten) signed by appropriate parties. Having overseen the execution process, the owner's agent uses a trusted application to digitally sign and wrap the information object and send it to a TCU.

Having previously created, executed or retrieved the electronic document, a submitter digitally signs and submits it to the TCU as in step 101. In this eSeal process, a wrapper that contains the signed content and digital signature block(s) that further contain the digital signature(s) and certificates(s) of the submitter and any other signatory is formed. There are five processes represented in FIG. 1: (1) action when an invalid digital signature(s) and/or revoked certificate(s) is found, (2) certificate status checking where status is locally cached, (3) certificate status checking where certificate status has to be retrieved, (4) CRL retrieval and processing, and (5) creating an eOriginal when the eSeal document is determined to be authentic. In step 103 the TCU receives the eSealed electronic document. In step 105 the TCU validates that the submitter has authority to add the electronic document to a selected account and/or transaction. In step 107, the TCU cryptographically verifies any digital signatures included in the electronic wrapped digital electronic document. The public key, found in the signer's X.509 authentication certificate, is used during the verification process. In step 109, the certificate validity period is extracted from the signer's authentication certificate, and in step 111, the validity period is checked against the current date and time. If any of the before mentioned tests fail, the submission is rejected in step 113 and a negative acknowledgment may be sent in step 115. The action is logged in step 117.

If all tests succeed, then certificate status for each certificate contained within the wrapper is requested from a CSS in step 119. In steps 121 and 123, certificate status is checked to see if it is present in a certificate status store. In step 125, certificate status is retrieved, and certificate validity is checked in step 127. If any certificate is found invalid for any reason, the submission is rejected in step 113, a negative acknowledgment may be sent in step 115, and the action is logged in step 117. The submitter is expected to seek remedy.

If in step 127 all digital signatures and certificates are determined to be valid for the submission, then in step 129 the TCU applies another wrapper that includes a date-time stamp and TCU digital signature block. The TCU then assumes control of the submission as an electronic original record on behalf of the owner of record. In step 131, the TCU places the electronic original in protected persistent storage, in step 133, the TCU sends a positive acknowledgment, and in step 117, the TCU logs the actions just completed.

If in step 123 it is determined that the certificate status is not present in the certificate status store, then the CSS in step 135 retrieves the issuing CA field from the certificate under test. In step 137, the CSS checks to see that the issuing CA is on the approved CA list, which may be maintained and accessed by a CA Connector Store in step 139. If the CA is not listed, then an invalid status is returned and the process resumes at step 125 and proceeds through steps 127, 113, 115, and 117, resulting in rejection of the submission and transmission of a negative acknowledgment and log entry. If the issuing CA is found on the approved CA list in step 137 and in step 141 it is determined that the certificate status reporting mechanism is a CRL, then a valid status indication is returned to step 125. If the CA is known and status is not present for the subject certificate, but the status mechanism is a CRL, then it may be assumed that the certificate status is valid, providing a CRL exists and is current for the CA. The process then proceeds through steps 127, 129, 131, 133, and 117, resulting in the creation of an electronic original, the transmission of a positive acknowledgment, and a log entry for the actions just completed.

If in step 141 the certificate status reporting mechanism is determined not to be a CRL, then the connector information obtained in step 137 is used to query the certificate status reporting mechanism. Contained in the connector description is all configuration information needed to query the appropriate certificate status repository, be it a CA, a directory, or any other type of certificate status repository. The status stores associated with steps 145, 147, 149, and 151 (i.e., respectively, an LDAP directory, an OCSP responder, a database, and a server) are examples of such repositories. In response to a query in step 143, one of these responds with certificate status information, and the status is added to the certificate status store in step 153.

Upon addition in step 153, the certificate status in-store process resumes at step 121 and continues through steps 123, 125, and 127 to a conclusion where the submission is either accepted (steps 129, 131, 133, 117) or rejected (steps 113, 115, 117).

CRLs are published in steps 155 and 159 at predetermined intervals and in step 157 as needed when a suspected compromise is reported and policy requires an immediate response. This process is further described in FIG. 2.

If the CA is known and status is not present, and the status mechanism is other than a CRL, the Certificate Status Service selects a connector and queries the certificate status mechanism (step 143). The connector contains the necessary information that makes status retrieval and interpretation possible. Any of the sources of real-time certificate status depicted in steps 145-151 will respond to a certificate status query with current status, but this process is not limited only to those sources. Status is received and added to the Certificate Status Store in step 153. When status is added, a response is generated and action returned to step 123, with the processing of status resuming in step 125 and completing as described previously.

Figure 2:
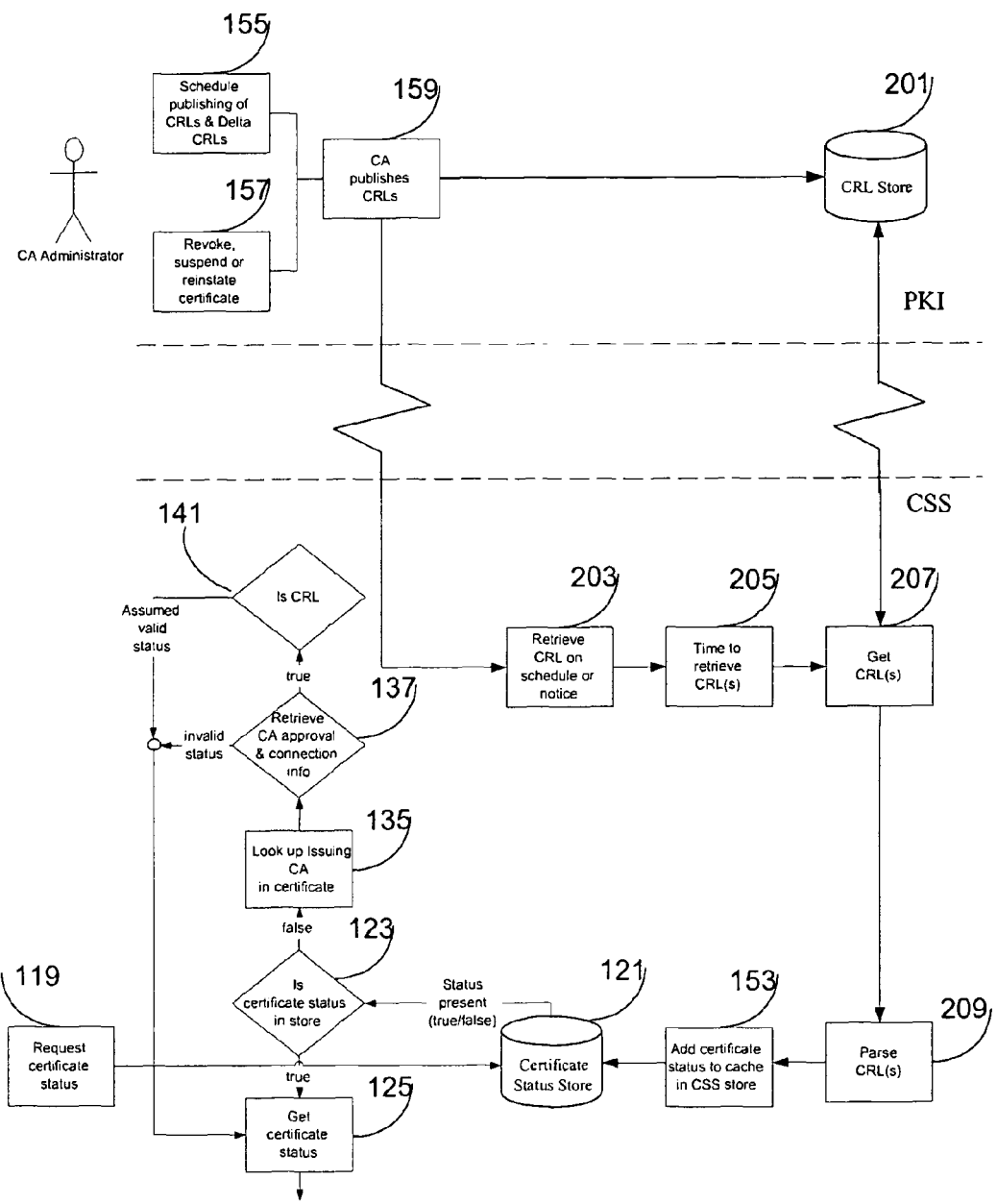
FIG. 2 illustrates background CSS processing whereby CRLs and ΔCRLs are added to the certificate status store.

Referring now to FIG. 2, the CSS performs CRL retrieval as a background process. A CRL contains a list of all revoked or suspended certificates until the current date and time is beyond the validity period contained in the certificate. Suspended certificates are treated as if they have been revoked, but they may be reinstated which results in their removal from the CRL. Revoked certificates cannot be recovered.

In steps 155 and 159, a CA Administrator configures the CA to publish CRLs at predetermined intervals. In step 157, the CA Administrator may also publish a Delta CRL as dictated by the local certificate or security policy. The CA Administrator or CA will push notice on publication of a Delta CRL. A Delta CRL may be generated whenever a certificate is revoked or suspended during the interval between publications of the full CRLs. Delta CRLs may contain a complete list of revoked CRLs. In step 201, CRLs and Delta CRLs are published to a CRL repository or directory.

In step 203, the CSS retrieves the CRL publication schedule or Delta CRL notice, and step 205 represents a timer used for scheduled retrieval. The timer also allows retrieval based on the "next update" field contained in all CRLs. In step 207, the CRL or Delta CRL is retrieved from the CRL repository. In step 209, the CRL or Delta CRL is parsed prior to being added in step 153 to an appropriate cache or list in the Certificate Status Store in step 121 based on the established schedule or upon notification. Parsing the CRLs allows for easier management and reduced overhead in CRL entry lookup. Steps 119, 123, 125, 135, 137, and 141 of the CSS are illustrated in FIG. 2 for completeness, and are implemented as described in connection with FIG. 1.

Figure 3:
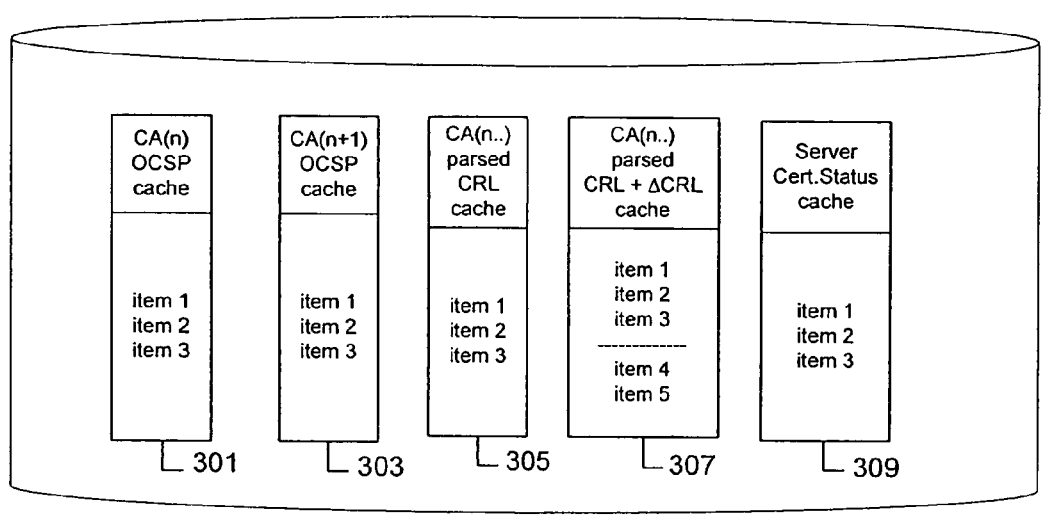
FIG. 3 illustrates separate caching of parsed CRLs, OCSP responses, and status derived from other certificate status reporting methods.

Referring now to FIG. 3, the Certificate Status Store contains a number of caches that hold certificate status from different reporting mechanisms. The caches (five of which are depicted in FIG. 3) may map to individual CAs (caches 301, 303) or collections of CAs (caches 307, 309). For real-time reported status, the status remains in the cache until space is needed (e.g., least frequently used) or based on a policy requirement (e.g., hold for only a specified time interval). Status is normally purged once the criterion is exceeded.

The purpose of the caches is to hold certificate status for a policy dictated period, thereby reducing communications overhead required during certificate status and CRL retrieval. The CSS therefore can bridge communications outages.

CRLs may be parsed and the individual revoked certificate statuses placed in a cache to reduce computational overhead resulting when the CRL has to be checked repeatedly. This is depicted by the caches 305, 307. The contents of the cache are replaced whenever a new full CRL is retrieved.

Referring now to FIG. 4, an example syntax is shown representing some of the more important data elements that need to be included in a digital signature block. FIG. 4 is a free form example of data elements that make up a digital signature where the signature is applied to multiple message fragments and a date/time stamp. This example is meant to be illustrative of the syntax that may be used for a digital signature block. It may be noted that the <CumulativeHashValue> data element is applied to HashValues of one or more fragments or the total content and any Authenticated Data.

Figure 5:
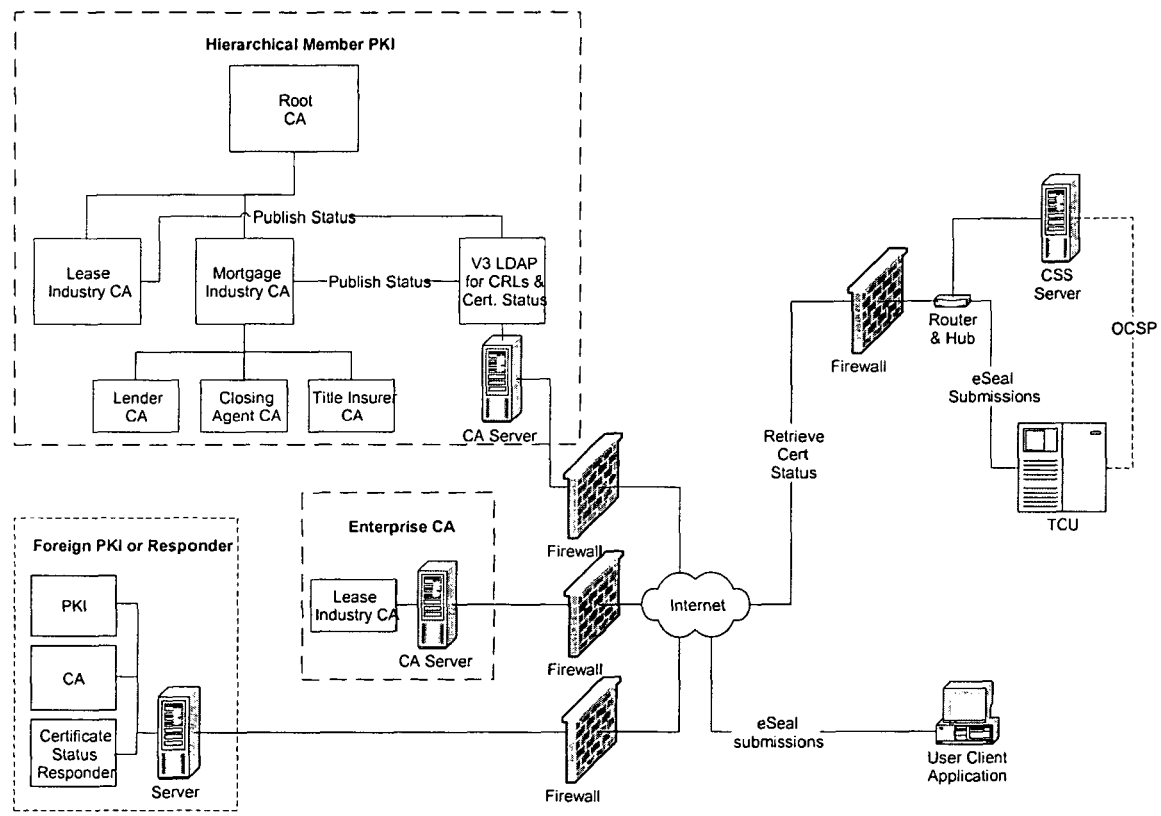
FIG. 5 illustrates TCU interaction with a CSS and CSS retrieval of certificate status via the Internet from member and foreign CAs.

FIG. 5 depicts a secure communications architecture showing the building blocks that support the Certificate Status Service. The figure shows the interaction among three CAs, the CSS, and the TCU. The CSS is preferably placed local to the TCU to guarantee high availability. Its primary purpose is to provide the TCU with a common interface and to ensure secure and timely provision of certificate status information. Its secondary purpose is to ensure a guaranteed level or quality of service by managing communication and computational overhead required in maintaining certificate status information.

As seen in FIG. 5, the CSS server and the TCU, with a suitable communications router and hub, are advantageously disposed behind a communications firewall. The router and hub direct information to the CSS and TCU as appropriate. Some of this information comprises eSeal submissions that are directed to the TCU as described above through a network such as the Internet from a User Client Application. Also depicted are CSS and TCU communications via OCSP.

FIG. 5 also depicts three CAs in different exemplary environments behind respective communication firewalls. An Enterprise CA might comprise a server that interfaces with a Lease Industry CA enclosed by the dashed lines. A Foreign PKI or Responder might comprise a server that interfaces with entities such as a PKI, CA, and certificate status responder. A Hierarchical Member PKI might include a server that interfaces to entities such as a V3 LDAP for CRLs and certificate status, a Root CA, and CAs for the mortgage and lease industries, lenders, closing agents, and title insurers.

Figure 6:
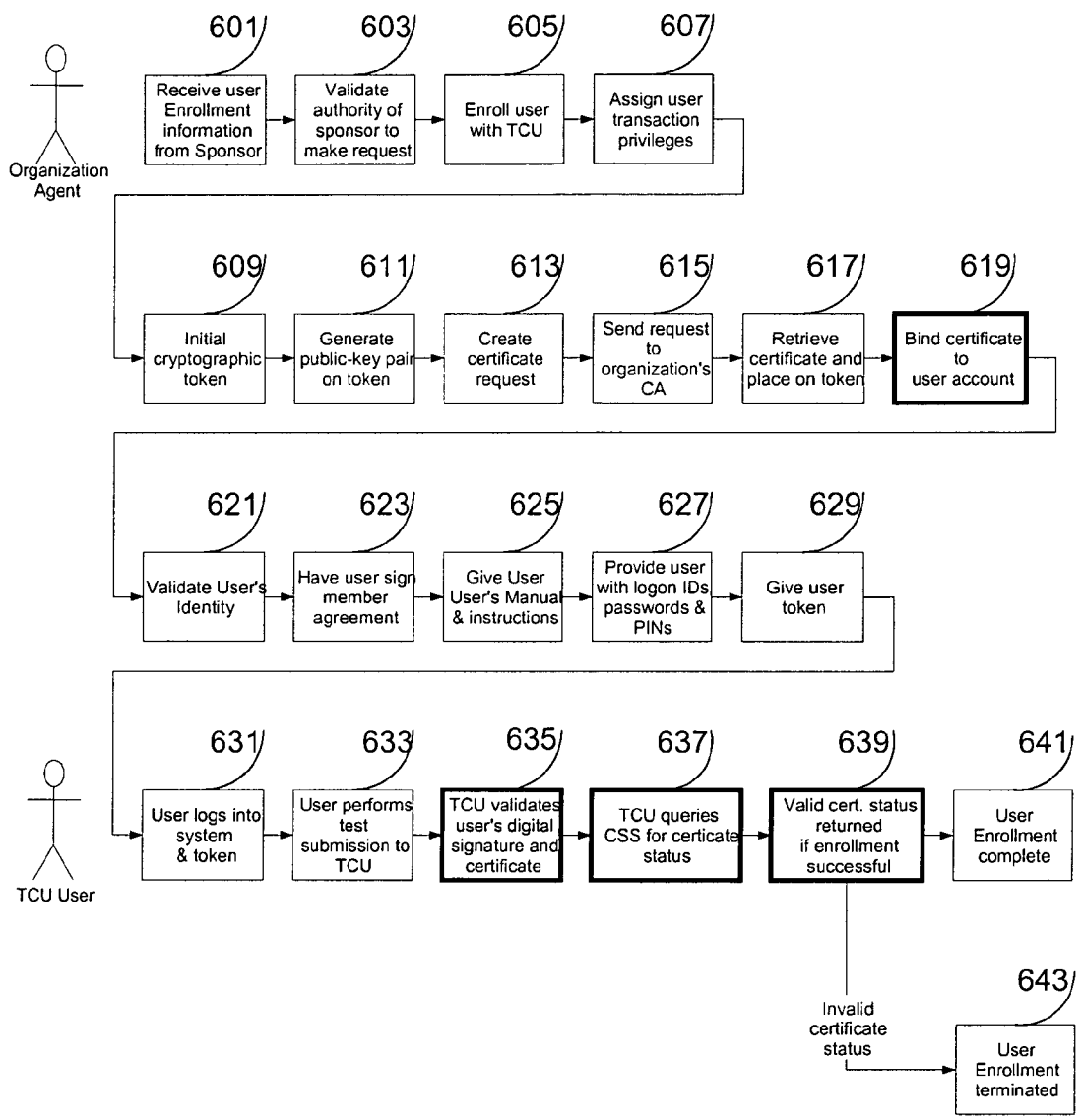
FIG. 6 illustrates a TCU user enrollment process terminating in a certificate status checking step, where digital signature validation demonstrates successful enrollment.
Figure 7:
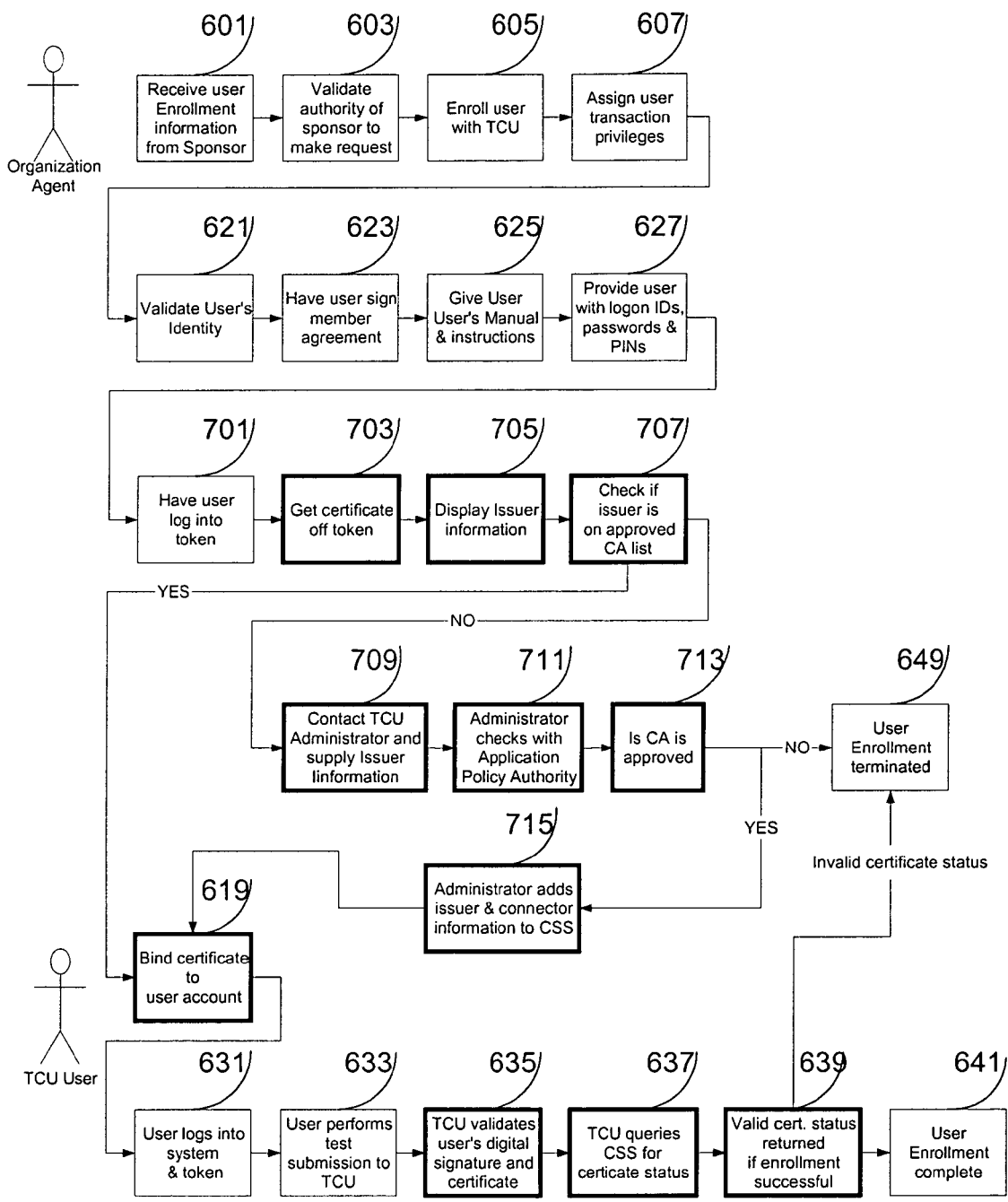
FIG. 7 illustrates a TCU user enrollment process where a foreign CA issued the user certificate, terminating in a certificate status checking step, where digital signature validation demonstrates successful enrollment.

FIGS. 6 and 7 depict the use of the Certificate Status Service during the user (subscriber and entity) enrollment process for both member CAs and foreign CAs, respectively.

A member CA is one that is trusted to issue user certificates. Foreign CAs are those operated by outside entities and need to be approved prior to their certificates being used in conjunction with TCU activities. User identity authorization needs to be rigorously enforced by all CAs or delegated to organization agents. An additional requirement is that a user's certificate needs to be directly associated or authorized for use with one or more subscribing organizations' accounts before the TCU can grant access to that user. Once this is accomplished, the TCU will accept the user's digital signature and rely on the CSS for certificate status validation.

In FIG. 6, the TCU enrollment process starts at step 601 with receipt by an organization's administrator/agent of user enrollment information from a sponsor. In step 603, this administrator/agent is charged with validating the sponsor's authority to make the request. Sponsors are normally only given control over their accounts. In step 605, the administrator/agent enrolls the user with the TCU, setting up a user account. In step 607, the administrator/agent may then assign transaction privileges to the user. Transaction privileges may include abilities to submit, version, transfer, etc. electronic originals and other source records.

In step 609, a cryptographic token (digital signature mechanism) is initialized, and in step 611, a public-key pair is generated on the token. In step 613, a certificate request is created, and in step 615, the request is sent to the organization's CA. In step 617, the certificate is retrieved and placed on the token. In step 619, the certificate is bound or associated with the user's TCU account.

In step 621, the user's identity is validated, for example by appearing in person to the organization's administrator/agent who can personally validate the user's identity. Normally, at least two forms of identification would be required. Since user participation is sponsored, this should be sufficient except for high valued transactions where someone known to the administrator/agent may be asked to vouch for the user's identity. In step 623, the user is asked to sign a contract agreement whereby the user agrees that use of the user's digital signature is binding. In step 625, the user is given an application user manual and whatever instruction is deemed necessary. In steps 627 and 629, the user is provided with logon IDs, temporary passwords, and the cryptographic token.

In step 631, the user logs onto the system, and in step 633, submits a test document to the TCU. In step 635, the TCU validates the user's digital signature and certificate. In step 637, the TCU queries the CSS for certificate status information. In step 639, the TCU receives status and proceeds accordingly. If the received certificate status is valid, enrollment completes at step 641, and the user is able to access and use the TCU. If the certificate status is invalid, enrollment terminates in step 643, and the administrator/agent determines the cause of the error and institutes remedy, which may involve repeating some or all of the outlined enrollment process steps. The reliable process outlined in FIG. 6 ensures that the enrollee is fully enabled at completion.

In FIG. 7, the user is allowed to use a cryptographic token previously issued by a foreign CA if policy dictated conditions are met. As described above, enrollment steps 601 through 607 are followed. User identity verification and contract steps 621 through 627 are also followed as described above.

Since the user already has a token, the process deviates from that described in FIG. 6. In step 701, the user places the token in a compatible reader and logs on. In step 703, an administrator application retrieves the user's certificate from the token. In step 705, the certificate information is displayed and the Issuing CA identification information is obtained. The CA information is used in step 707 to verify that the CA is on an approved list. If the CA is not on the approved list, the CA information is provided to the TCU administrator in step 709, and the administrator checks with an Application Policy Authority in step 711 for permission to continue enrollment. Only the Application Policy Authority can authorize adding a foreign CA to the approved list.

If permission is denied in step 713, enrollment terminates in step 649, giving the user three options. One is to ask for and use a token issued by a member CA. Another option is to request a review of the CA rejection decision. The third option is to ask for the names of previously approved foreign CAs.

If the Issuing CA is approved but not on the list in step 713, in step 715 the administrator adds the CA and connector information to the approved list, configuring the CSS to retrieve certificate status from the CA.

In step 619, the user's certificate is bound or associated with the newly created user account. As in FIG. 6 and steps 631 through 639, the user is asked to make a trial submission to the TCU to validate that the account has been set-up correctly and that the user can access the TCU. If the CSS returns valid status information, then enrollment completes at step 641. If the CSS returns invalid status, then the administrator determines the cause of the error and institutes remedy, which may involve repeating some or all of the enrollment process steps described above. The most likely cause of failure may relate to the CSS's being able to reach and correctly retrieve certificate status from the foreign CA.

The CSS plays a vital role in validating that the user certificate and issuing CA are both authorized in accessing a TCU or other system. If an issuing CA is removed from the approved list and its connector configuration data deleted, all associated users are denied further access to the TCU. It should be understood that the CSS can work with other applications and systems that require certificate status, including applications and systems that require inter-working with multiple PKIs and CAs.

For example, another use of the CSS is to provide status for trusted authentication certificates, including self-signed certificates, where an agreement exists between the client seeking services and the application operator. A representation of a trusted certificate (e.g., PEM, certificate ID, applied digital signature) is cached by the CSS, and status is queried using a trusted-certificate connector. This allows the application to have a single certificate status means regardless of whether the certificate was self-signed or issued by a CA. This trusted-certificate method may be used where a small number of controlled certificates are used by a community rather than querying the community's CA or CAs. Thus, it will be appreciated that the terms "CA" and "issuing CA" as used in this application encompass such an accepted issuer of self-signed certificates as well as conventional CAs.

Furthermore, the CSS may use a combination of connectors to retrieve certificate status. At least one connector may be "virtual", such as that just described for use with trusted certificates. The CSS invokes connectors in a predetermined, e.g., ordered, sequence until certificate status is acquired. This method enables creation of a hierarchy of status sources (e.g., most-trusted to least-trusted).

Figure 8:
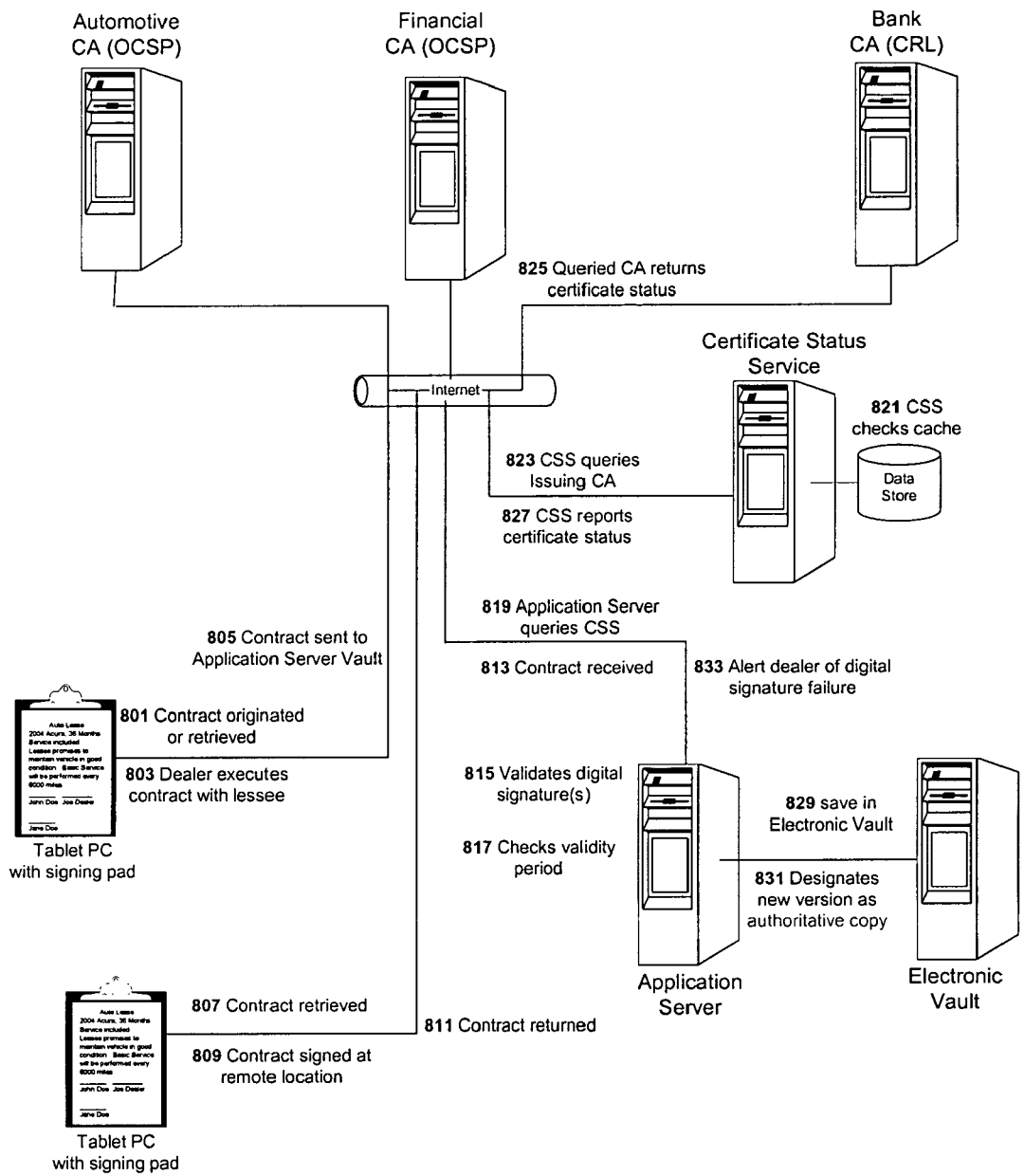
FIG. 8 depicts an automobile-leasing example that shows how a CSS can be utilized in electronic commerce.

FIG. 8 depicts an automobile-leasing example that shows how the CSS is utilized in e-commerce. The automobile dealer or the dealer's representative, hereafter called the dealer for simplicity, was issued a respective authentication certificate by an Automotive CA, which is depicted as a computer. The car's lessee, who may be present at the car dealership, was issued a respective authentication certificate by a Bank CA. A remote lessor was issued a respective authentication certificate by a Financial CA. Alternatively, either lessee or lessor may have created a self-signed certificate, which the dealer registered with the leasing application and the CSS, for example because the lessee is a regular customer of the dealer.

As explained in this application, the CSS retrieves and reports status for these and other certificates using any certificate status reporting means that uses an approved status reporting protocol. In FIG. 8, it is assumed that Automotive CA and Financial CA use OCSP, that the Bank CA uses a CRL, and that the dealer and lessees have some forms of token (e.g., PKCS#11, PKCS#12, browser key store, etc.) that contain their certificates and cryptographic signing means. It will be appreciated that FIG. 8 is just an exemplar of execution of a transaction; more or fewer CAs may be connected as necessary with communications as necessary for the particular transaction.

In step 801, the dealer either originates the lease contract or retrieves it from a leasing application, such as a computer program running locally at the dealership or remotely at a remote site, e.g., on an Application Server. In step 803, the dealer orchestrates the execution of the lease by the lessee and lessor. The lease may be displayed to both the local lessee and the remote lessor at this time, and the dealer may be called on to answer any questions and make corrections if needed. The dealer may arrange for displaying the lease to the lessor by providing a URL (uniform resource locator) to the lessor that enables the lessor to review and execute the lease, with the executed version returned to the dealer. After local signing by the lessee and the dealer, for example with a tablet pc that captures the lessee's digital signature on the lease, and remote signing by the lessor, the lease is transmitted (step 805) to an Electronic Vault, which is shown in communication with the Application Server. The digital signing by the lessee and dealer is advantageously dynamic, with the Application Server updating the displays by applying a "digitally signed by" indicator to the displayed image(s). The actual digital signatures are preferably not displayed.

It will be recognized that the Application Server and associated Electronic Vault may be used by the dealer to stage the contract for remote signing by the lessor. In steps 807, 809, and 811, the lessor retrieves the lease from the vault, agrees to the terms of the lease by digitally signing it, and returns its digitally signed version to the vault. Steps 807, 809, and 811 illustrate both multi-site collaboration and asynchronous transaction processing.

In steps 813, 815 and 817, the received electronic document(s) (the lease) are checked for digital signatures, and if any are found, the digital signatures are verified and the respective authentication certificates are validated. In step 817, the local time is checked to ensure that it falls within the validity period(s) of the certificate(s), and in step 819, the CSS is queried for the status of the certificate(s). In response in step 821, the CSS first checks its local cache memory or data store for certificate status, and if a certificate's status is present and current, the CSS returns the certificate's status as "active" in step 827. In step 823, if certificate status is not present or not current, the CSS queries the issuing CA using the connector type created for this purpose. In step 825, the issuing CA, e.g., the Bank CA, or its status reporting means (e.g., directory) returns status to the CSS, preferably using the same connector, and in step 827, the CSS reports the queried certificate's status back to the Application Server.

Assuming all digital signatures and certificates are verified and validated, proving the electronic document authentic, the Application Server assumes control of the electronic document and saves it in the Electronic Vault as a new version in step 829. Thus, it will be seen that, with the proper characteristics, the Application Server and Electronic Vault cooperate as a TCU. In step 831, the new version is designated as an authoritative copy, an electronic original record that may also be a transferable record, by appending a date-time stamp and applying the TCU's digital signature to the document. As long as at least one digital signature on a document is valid, this step takes place.

In step 833, if any digital signature or certificate fails to pass all tests, the dealer is alerted to seek remedy, which typically involves repeating steps 801 through 829 until valid replacement digital signatures are applied. The remedy process cannot be completed if the status of a signer's certificate is revoked or expired until a new certificate and cryptographic material are issued.

It will be understood that an information object, such as a lease for an automobile, may be presented in an electronic form, e.g., XML, PDF, PKCS#7, S/MIME, etc., that enables placement and detection of digital signatures and prevents unauthorized modification. Many of these forms therefore can be considered as providing security wrappers or envelopes for the included information.

It will also be understood that the CSS can be used to check status of certificates regardless of key usage. Such certificates include, but are not limited to, those for which the primary use is not identity and authentication, e.g., key agreement/exchange, certificate signing, CRL signing, key encryption, data encryption, encrypt only, decrypt only, and secure sockets layer (SSL). Accordingly, it will be understood that as used in this application the term "authentication certificate" generally encompasses such certificates that are not used for identification.

In addition, a CSS connector can advantageously embed more than one certificate status check in a single communication. Among other things, this capability may be used in validating some or all of a chain of user/entity certificates and CA certificates, e.g., a hierarchy of CAs from a Root CA down to an issuing CA. This provides additional assurance that all CAs in the certificate path are still valid.

This application has described a method for configuring a Certificate Status Service (CSS) that includes the steps of determining setup information needed to retrieve certificate status for a requisite issuing CA, identifying a connector compatible with a certificate status lookup technique used to retrieve certificate status from the issuing CA, configuring the connector with setup and communications parameters specific to the selected connector and the issuing CA, and setting up a CSS mapping between the issuing CA and the connector. The CA designation and connector is added to a list of approved CAs in a configuration store.

A method for executing a transaction by transferring authenticated information objects having respective verifiable evidence trails includes the step of retrieving, by a first party from a trusted repository, an authenticated information object. The authenticated information object includes a first digital signature of the submitting party, a first certificate relating at least an identity and a cryptographic key to the submitting party, a reliable date and time, a digital signature of the trusted repository, a certificate relating at least the identity and cryptographic key to the trusted repository; the digital signature and certificate of the submitting party having been validated by the trusted repository at submission attesting to the information object's authenticity; and the authenticated information object having been placed in storage as an electronic original information object placed under the control of the trusted repository.

The transaction execution method further includes the steps of requiring any signing entity to commit to use of and to be bound by their digital signature prior to the act of signing, executing said information object by any party by applying at least the digital signature and authentication certificate of the signing party, creating a signature block that contains at least the digital signature and authentication certificate of the signing party, associating the signature block with the information object, repeating the previous execution steps where multiple entities digitally sign the information object and/or wrapper, and forwarding the digitally signed and/or wrapped information object to a TCU. The TCU verifies every digital signature and validates each associated authentication certificate and retrieves status from a CSS. The signature blocks are rejected if the signer's digital signature does not verify or a signer's authentication certificate has expired or is reported to be revoked. Rejection of any signature block results in a request for a replacement signature block or initiation of remedy. If at least one signature block is determined to be valid, the TCU appends its own signature block, also containing reliable date and time, to the subject information object, creating an electronic original which it holds and controls on behalf of the owner.

Creating a digital signature block may include the steps of computing one or more content hashes for the one or more information object fragments or for the whole information object, computing a hash over the one or more content hashes and any appended data, such as the local date and time, signing rationale, or an instruction, encrypting the computed hash using the signing party's private key, thereby forming the signer's digital signature, and placing the signer's digital signature in the signature block along with the signer's authentication certificate. If the appended data includes a local date and time, creating a digital signature block may further include the steps of either displaying the local date and time, requiring a signer to affirm that the date and time are correct, and correcting the local date and time if either is incorrect, or relying on a system date and time if these are set by a trusted time service and local date and time are protected from tampering. The local date and time can be checked to ensure that they are accurate and that they fall within the user's authentication certificate validity period and that the local data and time are not before and not after the dates and times specified by the validity period.

Remedy of a digital signature that fails to verify requires the digital signature to be recomputed and the signature block to be retransmitted. Remedying a violation of the authentication certificate validity period includes notifying the user that the user's certificate has expired and must be renewed and notifying the transaction owner that the transaction is incomplete.

Placement of one or more signature blocks and the information contained therein is specified by at least one signature tag. One or more handwritten signatures and dates are digitized and used for information object execution, and placement of the signatures and dates is specified by at least one signature tag. One or more signature blocks can be sent to the TCU separately along with the designation of the corresponding signature tags and the TCU can validate every signature block sent independently or as a group. If either the digital signature verification or authentication certificate validation step fails, the TCU rejects the signature block and may request remedy, and if the signature block validation step succeeds, the TCU places the signature block at the indicated tag. To signature blocks sent separately, the TCU may add a reliable date and time to each signature block. According to business rules, the TCU appends its own signature block that contains a reliable date and time in a wrapper that encompasses the subject information object and inserted signature block fields, thereby creating an electronic original information object. Multiple user signature blocks may be added within a wrapper, and wrappers can be recursively applied to implement other business and security processes.

The TCU may validate the digital signature(s) and authentication certificate(s) present in a signature block(s) that is/are to be contained within or is/are to be added to content of an electronic original information object by checking in the business rules database that the signing entity identified by the authentication certificate has authority to perform the requested action, verifying the signing entity's digital signature, checking that certificate validity period overlaps current reliable date and time, checking that the conveyed local date and time fall within allowable deviation with the TCU date and time, and checking certificate status using a CSS. If any of these steps results in an invalid or false output, the digital signature is deemed invalid, the requested action is disallowed and remedy sought; otherwise, the digital signature is deemed valid and the requested action is allowed.

Registration of an issuing CA with a CSS may include the steps of vetting and approving the issuing CA for inclusion in a CSS knowledge base as "authorized" based on industry or organization business rules and system policy. If the vetting step fails, the issuing CA is added to the CSS configuration store as "not authorized" and/or CA registration terminates; otherwise, the issuing CA is added as "authorized", and the communication parameters (IP address, SSL key and certificate) and the method used for reporting certificate status (OCSP, CRL, LDAP) are added to the CSS configuration store, and the connector to interpret certificate status is added if not already implemented. In this way, the CSS enables interoperability between a system or TCU and a diverse set of certificate status responders.

Certificate status checking advantageously employs a CSS for establishing communications, retrieving and caching certificate status from approved certificate issuing CAs. When the CSS receives a certificate status query from a system or TCU, the CSS first checks its local cache to see if the certificate status is present and if found and within the time-to-live interval, returns the status. If the certificate status is not present or is outside the time-to-live interval, then the CSS retrieves the status by first requesting the connection information from its configuration store. The CSS then establishes a communications session with the certificate status reporting component identified in its configuration store. The CSS composes a certificate status request as per the method contained in the CSS configuration store, and the CSS retrieves certificate status from the certificate status reporting component and closes the session with the component. The CSS adds at least the certificate's ID, certificate status and time-to-live to its cache and returns certificate status to the requesting system or TCU.

The certificate status reporting may be based on a CRL and processing of the CRL. According to the issuing CA's publication schedule, the CSS retrieves the CRL from the certificate status reporting component listed in the CSS configuration store. The CSS clears its cache memory associated with the issuing CA, parses certificate status from the CRL, and places the certificate status into its cache associated with the issuing CA. Upon notification by an issuing CA that a CRL is available, the CSS may retrieve the CRL from the certificate status reporting component listed in the CSS configuration store. Where it is required by standards that the CRL is a complete CRL, then the CSS clears the cache associated with the issuing CA, parses the CRL, and places the certificate status and related information into the cache associated with Issuing CA. Where the CRL contains only changes occurring after publication of a full CRL, the CSS parses certificate status from the CRL and places certificate status and related information into the cache associated with issuing CA.

Using a CSS to obtain certificate status that allows a user, system or TCU to use a single means for obtaining certificate status can include the steps of querying the CSS for the status of an authentication certificate present in a signature block on an information object, where the status query may use a single means (e.g., OCSP), translating the status query to a form required by the issuing CA, and retrieving and/or reporting certificate status. If certificate status is revoked, the signature block is not used and remedy is required; if the digital signature verifies and certificate status is valid, the signature block is added to the electronic original information object.

The TCU can query the CSS to validate a signer's authentication certificate status by locating and reporting certificate status if the status is present and current in the CSS cache/data-store, and getting type and means for retrieving certificate status from the CSS configuration store. If the particular certificate status method is a CRL and the specified certificate's status is not found in the issuing CA cache in the CSS, then the CSS reports the certificate status as valid. If the certificate status method is not a CRL, then the CSS composes a certificate status request as per the method contained in CSS configuration store, and establishes appropriate communications with the issuing CA. The CSS retrieves certificate status from the status reporting component using the identified certificate status checking method and closes communications session. The CSS parses or interprets the retrieved certificate status, associates a time-to-live value equal to the period specified by status type as stated in the CSS policy, and adds at least the certificate's ID, status, and time-to-live values to issuing CA's certificate status cache. The CSS then returns certificate status to requesting system.

A method for enrolling users in a system or TCU where certificates are issued by an approved issuing CA that is known to a CSS includes vetting the user using established membership procedures and criteria, entering user enrollment information that has also been signed by an approved organization sponsor, and creating and sending a certificate request to the identified issuing CA. The user's authentication certificate is retrieved, issued, and placed on a token for delivery. Digital signature, digital signature verification and the CSS certificate status check are performed to ensure that public-key pair generation and certificate issuance process were completed correctly. The user is required to sign the user acceptance agreement that commits the user to give the same weight to use of their digital signature as they give to use of his or its hand written signature, the token is delivered to the user, and the user's system or TCU account is activated.

A method of enrolling users in a system or TCU where the user already has a certificate issued by a CA that is not previously known to a CSS can include querying the user's token for the user's authentication certificate and obtaining issuer information, and querying the CSS knowledge base to see if the issuing CA is contained therein. If not, the industry or organization policy administrator is contacted to determine whether or not the issuing CA meets the system rules for CA inclusion. Where the issuing CA is deemed "not authorized", registration terminates, and where the issuing CA is deemed "authorized", enrollment proceeds as described above.

A portion of a user's authentication certificate contents may be used to bind the certificate to a user's account by, after approving user for access to system or TCU, entering user enrollment information, inserting the user's token, that holds their authentication certificate, into a local token reader, retrieving and displaying the certificate contents, having the user affirm that the contents are correct, and adding selected fields to the system or TCU user enrollment data that is extracted from the certificate, such as certificate ID, issuing CA, a subset of the user's distinguished name or other identification information conveyed in certificate extensions (e.g., subjectAltName). The extracted data may be specified in the system or TCU policy so that extraction and data entry may be automated.

A method whereby a submitter of an information object vouches for the authenticity of a submitted information object includes the step of affixing the submitter's signature block to an information object and/or wrapper and forwarding it to a system or TCU. If signature block validation fails, the TCU requests retransmission or remedy, and if signature block validation succeeds, the TCU then checks that the identity of the submitter matches that of the initiator of communication session, rejecting the submission if the initiator and submitter are different. If all checks succeed, the TCU adds its signature block to the submission, creating an electronic original information object.

A method in a CSS of maintaining accurate and timely certificate status for real-time certificate status reporting means that employ a time-to-live data element includes these steps. If a CRL status method is used, then the CSS reports status. If certificate status is in cache and the time-to-live data element is not exceeded, then the CSS reports status. If the time-to-live data element is exceeded, the CSS clears the certificate status entry from the issuing CA cache. If status is retrieved using a real-time certificate status reporting means (e.g., OCSP, LDAP query, etc.) and status is not in cache, certificate status is requested, retrieved and reported. The CSS then adds at least the certificate's ID, certificate status and time-to-live to its cache and returns certificate status to the requesting system or TCU.

A certificate status use-counter data element may be added to a certificate's status entry in the CSS's issuing CA cache, and the status use-counter can be incremented or decremented every time a certificate's status is checked. If the status use-counter passes a threshold set by CSS policy, then the certificate status may be reported, but the CSS then clears the certificate status entry from the issuing CA cache. If the CSS-returned certificate status is invalid or revoked, then the system or TCU logs and/or reports the error to the submitter and/or transaction owner, and the requested action is disallowed and remedy sought. Otherwise, the digital signature is deemed valid and the requested action is allowed. A certificate status last-accessed data element may be added and used in conjunction with the use-counter to determine the activity level of the certificates' status.

A background process can cause the CSS to automatically retrieve updated certificate status and establish new time-to-live and use-counter data elements when a criterion in the CSS policy is met. This pre-fetch may be enabled to shorten the average time between system or TCU certificate status request and CSS response.

If a request is made to the CSS to retrieve certificate status for a new certificate and the issuing CA cache has reached its allocated buffer size limit, the certificate status last-accessed data element may be added to the certificate's status entry in the CSS's issuing CA cache. The CSS searches the issuing CA cache for the last-accessed data element with the oldest date (least-frequently-used) and clears that entry. The CSS then retrieves the requested certificates status, places it in the freed location in the issuing CA cache and reports the status to the system or trusted third-party repository of information objects which acts according to policy.

A method of status checking in a distributed CSS includes coordinating between CSSs whenever a new issuing CA is introduced, establishing entries in all CSS knowledge bases if another CSS has primary responsibility for querying an issuing CA, querying other CSSs instead of an issuing CA to reduce communications between the CSS and issuing CAs, synchronizing and caching certificate statuses locally if multiple local systems have a heavy concentration of certificate status requests against an issuing CA, and sharing or transferring the querying responsibility if another CSS has heavier activity with a given issuing CA than the original primary CSS.

Excluding a set of users associated with an issuing CA by changing the issuing CA reference in a CSS knowledge base to "not approved" can be done by requesting that approval for the issuing CA be withdrawn, reviewing the request on merit and determining what if any action is needed, and if it is determined that for any reason the issuing CA should be disabled, then changing the issuing CA's status in the CSS knowledge base to "not approved". Any subsequent request for status of a certificate issued by a CA listed as "not approved" results in the CSS returning a failed status.

A method of re-enabling a set of users disabled by previously setting an issuing CA reference to "not approved" can be done by requesting that approval be granted for re-enabling the issuing CA, reviewing the request on merit and determining what if any action is needed, and if it is determined that the issuing CA should be re-enabled, then changing the issuing CA's status in a CSS knowledge base to "approved". The CSS processes certificate status requests for reinstated issuing CAs as it would any other "approved" CA.

Communication with status reporting components can be established by creating a modular and reusable apparatus for each certificate status protocol used to locate, request and retrieve such information, using a version of the apparatus that is compatible with all CAs and responders that understand a particular certificate status protocol, and having a version of the apparatus for each status reporting protocol that is in use. The apparatus is designed so that it is easily adaptable to support future certificate status reporting protocols.

Executing a transaction in which the submitter is a first TCU and the submission is to transfer custody of one or more electronic originals to a second TCU can include having the owner of the transaction instruct the first TCU to transfer custody of one or more electronic original documents to a second TCU. The owner of the transaction instructs the second TCU to transfer custody of one or more electronic original documents, and the owner provides the first TCU with a manifest that identifies which electronic originals are to be transferred to the second TCU. The first TCU establishes communications with the second TCU, and identifies the purpose of its actions to the second TCU. The first TCU or owner may transmit the manifest to the second TCU so that it is able to determine when the transfer of custody has been completed. The first TCU transfers each identified electronic original to the second TCU, which uses the CSS to ensure that the first TCU's digital signature on each transferred electronic original is valid and that the electronic originals are unaltered. If any of the first TCU's digital signatures are invalid, then the second TCU notifies the first TCU and seeks remedy (e.g., asks the first TCU to resign using current authentication certificate). If the first TCU is unable to comply, the second TCU logs the event and notifies the transaction owner that the requested transfer of custody has failed; otherwise, the second TCU creates a new wrapper for each successfully transferred information object, adding a date-time stamp and its signature block. The second TCU notifies the first TCU of each successful transfer, and upon completion, the first TCU may at the discretion of the owner either mark and retain copies in such a manner that they cannot be construed to be an original, or may destroy all copies that exist of the transferred information objects. The process is repeated until all identified electronic originals are transferred. In this way, the second TCU becomes the custodian for the transferred records that are the authoritative copies. The second TCU may append a reliable date and time, digitally sign, wrap and store the manifest to make it an independent element of the trail-of-custody.

In executing a transaction, the owner's instruction may also state that a transfer of ownership takes place, and transfer of ownership documentation may be placed in either the first or second TCU. The responsible TCU validates the authenticity of the transfer of ownership documents by verifying all digital signatures, certificate validity periods, and using the CSS to check certificate status. The TCU then appends reliable date and time, and digitally signs, wraps and stores these now electronic original information objects, which are added to the manifest. Where these electronic originals are placed in the first TCU, transfer-of-ownership is implemented prior to transfer-of-custody, and the initiating manifest becomes part of the trail-of-ownership.

Some of the transferred records may be simple electronic information objects and not just electronic originals. The CSS may use any appropriate certificate status protocol to communicate with a system or TCU.

This invention can be embodied in many different forms without departing from its essential character, and thus the embodiments described above should be considered illustrative, not restrictive, in all respects. It is emphasized that the terms "comprises" and "comprising", as used in this description and the following claims, are meant as specifying the presence of stated features without precluding the presence of one or more other features. The intended scope of the invention is set forth by the following claims, rather than the preceding description, and all variations that fall within the scope of the claims are intended to be embraced therein.

What is claimed is:

1. A method of providing a Certificate Status Service ("CSS") for checking validities of certificates issued by respective issuing Certification Authorities ("CAs"), comprising the steps of:
   receiving status queries for one or more certificates from requesting entities;
   if the issuing CAs are not found on a CSS's list of approved CAs or the certificates have expired, returning invalid statuses for those certificates;
   if current certificate statuses are found in a CSS cache memory, returning the found certificates' statuses;
   if any certificate statuses have not yet been determined, fetching, from a CSS configuration store, all certificate status reporting methods and communications information that are needed for retrieving, from the respective issuing CAs, a certificate status of each certificate whose status has not yet been determined;
   configuring connectors based on the identified information for communicating with the issuing CAs;
   communicating with the issuing CAs according to the configured connectors;
   retrieving the certificate statuses of all queried certificates;
   processing the certificate statuses according to certificate status reporting methods implemented by the CSS including, but not limited to, a real-time certificate status retrieval protocol including LDAP, OCSP, and any other certificate status retrieval protocol for retrieving certificate statuses in real-time, and one of Certificate Revocation Lists (CRLs) that are retrieved at specified publication intervals and Delta Certificate Revocation Lists ($\Delta$CRLs) that are retrieved upon notification;
   recording retrieved certificate statuses in the CSS cache memory; and
   returning the retrieved certificate statuses to the requesting entities;
   wherein the issuing CAs and connector parameters, which enable the CSS to interwork with any CAs and CA domains even though the CSS and issuing CAs may operate using dissimilar certificate practices and policies, are designated on a list of approved CAs in the CSS configuration store.

2. The method of claim 1, wherein a certificate indicating a validity period is deemed to have expired if a local date and time fall outside the validity period.

3. The method of claim 2, wherein the issuing CA is added to at least one organization's list of approved CAs by vetting and approving the issuing CA according to predetermined business rules, wherein the business rules include at least one rule for reviewing the acceptability of the CA's certificate policy and practices for ensuring the identity of the entity requesting the certificate, and if the issuing CA is vetted and not approved or later disapproved, the issuing CA is added to the at least one organization's list of not-approved CAs in the CSS configuration store and/or has any prior entry removed from the at least one organization's list of approved CAs.

4. The method of claim 3, wherein vetting and approving the issuing CA include registering a representation of a trusted certificate of the CA with the CSS and adding, to the CSS configuration store, at least the certificate status reporting component of the CA, the certificate status reporting component including, but not limited to CRL, OCSP, or LDAP; a time-to-live data element; and communication information needed to configure a connector.

5. The method of claim 4, further comprising the steps of:
   checking and updating the CSS cache memory for the queried certificate status, and if the queried certificate status is found in the CSS cache memory, checking that the local date and time are within the certificate's validity period and that the time-to-live data element and use-counter values are within a threshold;
   if any of the validity period, time-to-live data element, or use-counter values are unacceptable, clearing the CSS cache memory, wherein if the queried certificate status is not found in the CSS cache memory, the CSS establishes a communication session with the certificate status reporting component of the issuing CA, composes a certificate status request using one of the CRL or real-time reporting methods according to the configured connector, retrieves the queried certificate status from the certificate status reporting component, closes the communication session with the certificate status reporting component, and adds at least one of the certificate identification, certificate's status, use-counter, and time-to-live data element to the CSS cache memory.

6. The method of claim 1, wherein if the certificate status reporting method is indicated to be a Certificate Revocation List, then, according to a publication schedule of the issuing CA, the CSS retrieves the CRL from a certificate status reporting component listed in the CSS configuration store, the CSS clears the CSS cache memory associated with the issuing CA, and the CSS extracts the certificate statuses of all certificates from the CRL and stores the extracted certificate statuses in the CSS cache memory associated with the issuing CA.

7. The method of claim 1, wherein if the certificate status reporting method is indicated to be a ΔCRL, then upon notification by the issuing CA that the ΔCRL is available, the CSS retrieves the ΔCRL from a certificate status reporting component listed in the CSS configuration store and if the ΔCRL is a full CRL, then the CSS clears the CSS cache memory associated with the issuing CA, extracts all certificate statuses from the CRL, and stores the extracted certificate statuses in the CSS cache memory, and if the ΔCRL contains changes occurring after publication of a full CRL, the CSS extracts all certificate statuses from the ΔCRL, and stores the extracted certificate statuses in the CSS cache memory.

8. The method of claim 1, wherein the communicating step includes communicating according to a plurality of connectors to multiple CAs and PKIs.

9. The method of claim 1, wherein the connectors allow more than one certificate status request to be chained together in a single communicating step between the CSS and the issuing CA.

10. The method of claim 1, wherein certificates are held in the CSS configuration store until expiration and information is extracted as needed.

11. The method of claim 1, further comprising retrieving statuses of the certificates issued by the approved CAs in response to queries from a trusted third-party repository of information objects to the CSS to validate the certificate statuses, further comprising the steps of:
locating and reporting the requested certificate statuses if the certificate statuses are present and current in the CSS cache memory;
if the certificate statuses are not present in the CSS cache memory, performing the steps of:
obtaining the communications information, certificate status types, and retrieval methods from the CSS configuration store;
if the certificate status type is CRL, and the CRL in the CSS cache memory is current, and the certificate statuses are not found in the CSS cache memory, then reporting the certificate statuses as valid; and
if the certificate status type is CRL, the CRL is not current or found in the CSS cache memory, and local time is greater than a next scheduled publication time for the CRL, or if the certificate status type is not CRL,
creating connectors and composing certificate status requests according to the respective certificate status type;
establishing communication sessions with the certificate status reporting components of the issuing CAs;
retrieving the certificate statuses from the certificate status reporting components using the obtained retrieval methods and ending the communication sessions;
interpreting the retrieved certificate statuses;
associating, with the interpreted retrieved certificate statuses, time-to-live values representing periods specified by the respective CSS policy policies for the certificate status types;
adding at least one of the certificate identification, the interpreted retrieved certificate status and time-to-live values to the CSS cache memory; and
reporting the interpreted retrieved certificate statuses to the trusted third-party repository of information objects.

12. The method of claim 1, further comprising:
reporting valid certificate statuses when the certificate status type is CRL, the CRL is current, and the certificate statuses are not found in the CSS cache memory;
reporting the certificate statuses when the certificate statuses are found in the CSS cache memory and the time-to-live and use-counter values have not exceeded respective thresholds; otherwise,
if either the time-to-live or use-counter values have exceeded respective thresholds, clearing the certificate statuses from the CSS cache memory;
if the certificate statuses have not been reported in a previous step, then requesting and retrieving the certificate statuses using the certificate status reporting method indicated in the CSS configuration store;
when the status type is CRL, retrieving and parsing the new CRL at a next indicated publication time;
when the certificate status type is at least one of the type LDAP, OSCP, and any other real-time certificate status reporting protocol, retrieving and parsing the certificate status;
adding at least one of the certificate identification, certificate status, time-to-live and use-counter values to the CSS cache memory; and
reporting the retrieved certificate statuses to the requesting entity.

13. The method of claim 12, wherein a certificate status use-counter data element is added to the CSS's certificate status cache, wherein the certificate status use-counter data element is incremented or decremented every time the certificate's status is checked, and if the certificate status use-counter value exceeds a respective threshold, then the certificate status is reported and the CSS cache memory is cleared with respect to the certificate status.

14. The method of claim 13, wherein a certificate status last-accessed data element is added to the CSS cache memory, and the certificate status last-accessed data element in conjunction with the certificate status use-counter data element enable the CSS to determine an activity level of the certificate's status.

15. The method of claim 14, wherein when a request is made to the CSS to retrieve a certificate status of a new certificate and the CSS cache memory has reached an allocated memory size limit, the CSS searches the CSS cache memory for every certificate status entry where the current time exceeds the time-to-live value for every certificate status entry where the value of the use-counter data element exceeds the threshold and the value of the at least one certificate status entry with the oldest last-accessed value, wherein the CSS then clears the respective CSS cache memory entries, retrieves the requested certificate status, places the retrieved certificate status in the CSS cache memory, and reports the retrieved certificate status to the requesting entity.

16. The method of claim 15, wherein a cleanup process removes all stale cache entries as required when new CRLs or ΔCRLs are retrieved, one of the thresholds is exceeded, or freeing up of cache is required.

17. The method of claim 1, wherein the CSS can query a second CSS for the certificate status if the second CSS is designated in the CSS configuration store as an approved certificate status reporting component for the issuing CA.

* * * * *